(12) United States Patent
Mizuno et al.

(10) Patent No.: US 10,126,566 B2
(45) Date of Patent: Nov. 13, 2018

(54) EYEGLASS LENS DESIGN METHOD, EYEGLASS LENS MANUFACTURING METHOD, EYEGLASS LENS, EYEGLASS LENS DESIGN SYSTEM, EYEGLASS LENS DESIGN PROGRAM, AND RECORDING MEDIUM

(71) Applicant: NIKON CORPORATION, Tokyo (JP)

(72) Inventors: Masatomo Mizuno, Ichikawa (JP); Yukimasa Uchiyama, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 119 days.

(21) Appl. No.: 15/240,477

(22) Filed: Aug. 18, 2016

(65) Prior Publication Data
US 2017/0045755 A1   Feb. 16, 2017

Related U.S. Application Data

(63) Continuation of application No. PCT/JP2015/054629, filed on Feb. 19, 2015.

(30) Foreign Application Priority Data

Feb. 20, 2014  (JP) ................... 2014-030494

(51) Int. Cl.
G02C 7/02     (2006.01)
G02C 7/06     (2006.01)

(52) U.S. Cl.
CPC .......... *G02C 7/027* (2013.01); *G02C 7/028* (2013.01); *G02C 7/063* (2013.01); *G02C 7/066* (2013.01)

(58) Field of Classification Search
CPC ......... G02C 7/024; G02C 7/025; G02C 7/027
(Continued)

(56) References Cited

U.S. PATENT DOCUMENTS

2004/0032565 A1*  2/2004  Yamakaji ............... G02C 7/027
                                                                  351/159.42
2009/0290125 A1   11/2009  Varnas et al.
(Continued)

FOREIGN PATENT DOCUMENTS

DE   10 2009 005214        7/2010
EP    1 154 302 A1        11/2001
(Continued)

OTHER PUBLICATIONS

European Search Report issued by European Patent Office dated Sep. 12, 2017 in counterpart Application No. 15752276.4.
(Continued)

*Primary Examiner* — Darryl J Collins
(74) *Attorney, Agent, or Firm* — Finnegan, Henderson, Farabow, Garrett & Dunner LLP

(57) ABSTRACT

An eyeglass lens design method includes: a prescription requirement-setting step in which prescription requirements for an eyeglass lens to be worn by an eyeglass wearer are set; a pattern setting step in which a plurality of patterns taking different values for at least one of; the prescription requirements for the eyeglass lens, a lens type, a progressive zone length, a wearing condition parameter pertaining to an eyeglass wearing condition in which the eyeglass wearer wears eyeglasses, a lifestyle/habit parameter pertaining to a lifestyle/habit of the eyeglass wearer and an optimization parameter used to control optimization of design for the eyeglass lens, are set; and a designing step in which eyeglass lens contours, each corresponding to one of the plurality of patterns having been set in the pattern setting step, are designed.

19 Claims, 21 Drawing Sheets

(58) Field of Classification Search
USPC .................................. 351/159.74–159.77
See application file for complete search history.

(56) References Cited

U.S. PATENT DOCUMENTS

2012/0008090 A1    1/2012  Atheimer et al.
2014/0268007 A1*   9/2014  Ben-Shahar ........... G02C 5/001
                                                    351/110

FOREIGN PATENT DOCUMENTS

| JP | 3-260838 | 11/1991 |
| JP | H03-260838 | 11/1991 |
| JP | 2002-14829 | 1/2002 |
| WO | WO 2000/18035 | 2/2000 |
| WO | WO 2010/044260 | 4/2010 |
| WO | WO 2011/042504 A1 | 4/2011 |

OTHER PUBLICATIONS

International Search Report issued by the Japanese Patent Office in International Patent Application No. PCT/JP2015/054629, dated May 19, 2015 (2 pages).
Written Opinion of the International Searching Authority and International Preliminary Report on Patentability issued by The International Bureau of WIPO in International Application No. PCT/JP2015/054629, dated May 19, 2015 (12 pages).
Office Action issued by Japanese Patent Office dated Aug. 1, 2017 in counterpart Application No. 2016-504161, and English translation thereof.

\* cited by examiner

EYEGLASS LENS DESIGN METHOD, EYEGLASS LENS MANUFACTURING METHOD, EYEGLASS LENS, EYEGLASS LENS DESIGN SYSTEM, EYEGLASS LENS DESIGN PROGRAM, AND RECORDING MEDIUM

This application is a continuation of International Application No. PCT/JP2015/054629 filed Feb. 19, 2015.

INCORPORATION BY REFERENCE

The disclosures of the following priority application and the International Application are herein incorporated by reference: Japanese Patent Application No. 2014-030494 filed Feb. 20, 2014; and International Application No. PCT/JP2015/054629 filed Feb. 19, 2015.

BACKGROUND ART

1. Technical Field

The present invention relates to an eyeglass lens design method, an eyeglass lens manufacturing method, an eyeglass lens, an eyeglass lens design system, an eyeglass lens design program and a recording medium.

2. Description of Related Art

A progressive power lens that includes a far-vision portion formed as a region for relatively long-distance vision, located at an upper position in the lens when it is worn as part of an eyeglass, a near-vision portion formed as a region for shorter-distance vision relative to the far-vision portion, located at a lower position in the lens, and a progressive portion located between the far-vision portion and the near-vision portion, which is formed as a region that connects the far-vision portion and the near-vision portion by continuously altering the surface refractive power, is utilized as a corrective eyeglass lens in order to compensate for deterioration in the accommodation ability due to presbyopia in the known art.

For purposes of optical performance improvement, a progressive power lens is now designed by evaluating the lens performance with beams of light equivalent to lines of sight of the wearer of the progressive power lens so as to assure improved optical performance with respect to the light beams equivalent to the wearer's lines of sight. In the international publication No. WO 2010/044260, the design is optimized, since the prescription and the conditions with which the lens is worn change from one wearer to another and thus the progressive power lens needs to be specially designed for each user.

In the art taught in the above publication, the contour of the lens surface of the progressive power lens is designed through optimization executed so as to improve the optical performance with respect to light beams reflecting the prescription, the conditions with which the particular wearer uses the lens and the like unique to the eyeglass wearer and thus assure optical performance closer to a target optical performance.

SUMMARY

An eyeglass lens design method according to a first aspect of the present invention comprises: a prescription requirement-setting step in which prescription requirements for an eyeglass lens to be worn by an eyeglass wearer are set; a pattern setting step in which a plurality of patterns taking different values for at least one of; the prescription requirements for the eyeglass lens, a lens type, a progressive zone length, a wearing condition parameter pertaining to an eyeglass wearing condition in which the eyeglass wearer wears eyeglasses, a lifestyle/habit parameter pertaining to a lifestyle/habit of the eyeglass wearer and an optimization parameter used to control optimization of design for the eyeglass lens, are set; and a designing step in which eyeglass lens contours, each corresponding to one of the plurality of patterns having been set in the pattern setting step, are designed.

According to a second aspect of the present invention, in the eyeglass lens design method according to the first aspect, it is preferable that in the pattern setting step, at least one set of prescription requirements that is at least partially different from the prescription requirements having been set in the prescription requirement-setting step is generated; and in the designing step, eyeglass lens contours are designed respectively corresponding to the prescription requirements having been set in the prescription requirement-setting step and the prescription requirements having been generated in the pattern setting step.

According to a third aspect of the present invention, in the eyeglass lens design method according to the second aspect, it is preferable that the prescription requirements that are at least partially different from the prescription requirements having been set in the prescription requirement-setting step are substantially identical to the prescription requirements having been set in the prescription requirement-setting step.

According to a fourth aspect of the present invention, in the eyeglass lens design method according to any one of the first to the third aspects, it is preferable that in the designing step, eyeglass lens contours, each corresponding to one of the plurality of patterns having been set in the pattern setting step, are designed through parallel processing.

According to a fifth aspect of the present invention, in the eyeglass lens design method according to any one of the first to the fourth aspects, it is preferable that the designing step includes a correction step in which results obtained by designing an eyeglass lens contour based upon the prescription requirements generated through the pattern setting step are corrected so as to adjust toward the prescription requirements having been set through the prescription requirement-setting step.

According to a sixth aspect of the present invention, in the eyeglass lens design method according to any one of the first to the fifth aspects, it is preferable that in the designing step, an eyeglass lens is designed based upon results obtained by completing design work for an eyeglass lens contour before a predetermined time limit is reached, among eyeglass lens contour designs corresponding to the prescription requirements having been set in the prescription requirement-setting step and the prescription requirements having been generated in the pattern setting step.

According to a seventh aspect of the present invention, in the eyeglass lens design method according to any one of the first to the sixth aspects of the present invention, it is preferable to further comprise a deviation quantity setting step in which a deviation quantity for the wearing condition parameter is set, wherein: in the pattern setting step, a pattern taking a value measured on the eyeglass wearer and a pattern taking a value deviating from the measured value by the deviation quantity are set for the wearing condition parameter.

According to an eighth aspect of the present invention, in the eyeglass lens design method according to any one of the first to the seventh aspects, it is preferable to further comprise an evaluation/selection step in which a plurality of eyeglass lenses having been designed in the designing step are evaluated and an eyeglass lens to be provided to the eyeglass wearer is selected based upon evaluation results.

According to a ninth aspect of the present invention, in the eyeglass lens design method according to any one of the first to the eighth aspects, it is preferable to further comprise: an output step in which a plurality of eyeglass lenses having been designed in the designing step are evaluated and evaluation results are output via an output device.

According to a tenth aspect of the present invention, in the eyeglass lens design method according to any one of the first to the ninth aspects, it is preferable to further comprise: a pattern quantity specifying step in which a quantity of patterns is specified, wherein: in the pattern-setting step, patterns are set in the quantity specified in the pattern quantity-specifying step.

According to an 11th aspect of the present invention, in the eyeglass lens design method according to any one of the first to the tenth aspects, it is preferable that in the designing step, an optimization calculation step and an optimization parameter setting step are alternately executed repeatedly, in the optimization calculation step eyeglass lens optimization calculations are executed individually in correspondence to an optimization parameter value for a left eyeglass lens and an optimization parameter value for a right eyeglass lens through parallel processing, and in the optimization parameter setting step the left eyeglass lens and the right eyeglass lens designed in the optimization calculation step are evaluated and an optimization parameter for the left eyeglass lens and an optimization parameter for the right eyeglass lens to be used in subsequent optimization calculations are set based upon evaluation results.

According to a 12th aspect of the present invention, in the eyeglass lens design method according to any one of the first to the 11th aspects, it is preferable that in the designing step, an optimization calculation step and an optimization parameter setting step are alternately executed repeatedly, in the optimization calculation step eyeglass lens optimization calculations are executed each in correspondence to one of a plurality of optimization parameter values through parallel processing, and in the optimization parameter setting step a plurality of eyeglass lenses designed in the optimization calculation step are evaluated and a plurality of optimization parameter values to be used in subsequent optimization calculations are set based upon evaluation results.

An eyeglass lens manufacturing method according to a 13th aspect of the present invention manufactures an eyeglass lens designed through the eyeglass lens design method according to any one of the first to the 12th aspects.

According to a 14th aspect of the present invention, an eyeglass lens is designed through the eyeglass lens design method according to any one of the first to the 12th aspects.

An eyeglass lens design system according to a 15th aspect comprises: a prescription requirement setting unit that sets prescription requirements for an eyeglass lens to be worn by an eyeglass wearer; a pattern setting unit that sets a plurality of patterns taking different values for at least one of; the prescription requirements for the eyeglass lens, a lens type, a progressive zone length, a wearing condition parameter pertaining to an eyeglass wearing condition in which the eyeglass wearer wears eyeglasses, a lifestyle/habit parameter pertaining to a lifestyle/habit of the eyeglass wearer and an optimization parameter used to control optimization of design for the eyeglass lens; and a designing unit that designs eyeglass lens contours, each in correspondence to one of the plurality of patterns having been set by the pattern setting unit, through parallel processing.

An eyeglass lens design program according to a 16th aspect of the present invention enables a computer to execute: a prescription requirement-setting step in which prescription requirements for an eyeglass lens to be worn by an eyeglass wearer are set; a pattern setting step in which a plurality of patterns taking different values for at least one of; the prescription requirements for the eyeglass lens, a lens type, a progressive zone length, a wearing condition parameter pertaining to an eyeglass wearing condition in which the eyeglass wearer wears eyeglasses, a lifestyle/habit parameter pertaining to a lifestyle/habit of the eyeglass wearer and an optimization parameter used to control optimization of design for the eyeglass lens, are set; and a designing step in which individual threads or processes are generated each for purposes of designing an eyeglass lens contour in correspondence to one of the plurality of patterns having been set in the pattern setting step, and design processing is executed in the threads or the processes in parallel.

A recording medium according to a 17th aspect of the present invention has recorded therein the eyeglass lens design program according to the 16th aspect.

DESCRIPTION OF EMBODIMENTS

The calculation executed for purposes of the optimization described in Description of Related Art may be completed in several minutes or it may take more than 24 hours. When the merit function, indicating the level of optimization, takes widely fluctuating values, e.g., 15, 9, 21, 18 and so forth, the optimization has not been successful and in such a case, it is possible that no design solution will be achieved even after a number of processing hours. The length of time required for optimization varies depending upon the particulars of the prescription requirements, and it is difficult to predict how long it will take to optimize a lens.

However, there is a limit to how much time can be spent on optimization, since eyeglass lenses must be delivered on time. For this reason, if computerized optimization cannot be completed and a design solution cannot be found beyond a predetermined time limit, the computerized optimization is abandoned and instead the eyeglass lens design is assigned to a human technician. If the time limit is tight, the human technician must perform more of the design work manually and thus, the advantage of the automated design process is lost. While a less rigorous time limit may be set, the optimization process still may not be completed and, in such a case, the eyeglass lens will not be delivered on time. To sum up, there is an issue in the related art in that a design solution may not always be reached through optimization.

Explanations are given on the embodiments below.

Before describing the embodiments of the present invention in specific detail, terms used in the description of the embodiments of the present invention and the prior art related to the present invention will be explained. It is to be noted that positional terms such as up, down, left, right and the like used in relation to an eyeglass lens in the following description are defined based upon the relationship among positions taken on the eyeglass lens to be used as part of a pair of eyeglasses worn in a natural, upright orientation.

Figure 1A:
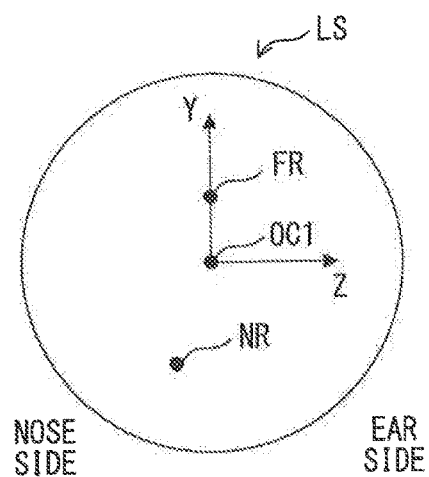
FIG. 1A and FIG. 1B show illustrations indicating reference points set for a progressive power lens.
Figure 1B:
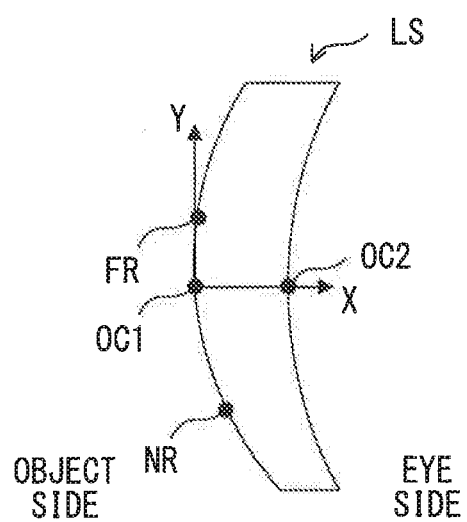

A progressive power lens includes a far-vision portion used for long distance vision, a near-vision portion used for short distance vision and a progressive portion connecting the far-vision portion and the near-vision portion. In reference to FIG. 1, reference points set on a progressive power lens, i.e., prism reference points OC 1 and OC 2, a far vision reference point FR and a near vision reference point NR, will be explained. FIG. 1(a) is a front view of a progressive power lens LS for the left eye and FIG. 1(b) shows the progressive power lens LS viewed from a side. In reference to the prism reference points OC 1 and OC 2 set at a substantially central position of the progressive power lens LS, a prismatic power value specified in the prescription is measured. The far vision reference point FR is used as a measurement reference point when measuring the long distance power of the lens in the far-vision portion. The near vision reference point NR is used as a measurement reference point when measuring the short distance power of the lens in the near-vision portion.

A progressive power lens is designed in the embodiments described below through optimization executed by using, for instance, transmitted light beams. A transmitted light beam is a light beam passing through a cycloduction point of the eyeglass wearer and a given point on the lens. The average refractive power achieved with a transmitted light beam passing through the cycloduction point of the eyeglass wearer and the far vision reference point will be hereafter referred to as a far vision transmission power (unit: diopter). The average refractive power achieved with a transmitted light beam passing through the cycloduction point of the eyeglass wearer and the near vision reference point will be hereafter referred to as a near vision transmission power (unit: diopter). The value obtained by subtracting the far vision transmission power from the near vision transmission power will be referred to as an addition power under wearing conditions (unit: diopter). In the embodiment described above, a progressive power lens is designed through optimization so that the contour of the lens surface is determined by ensuring that the spherical diopter power and the addition power specified as prescription requirements for the eyeglass wearer are equal to the far vision transmission power and the addition power under wearing conditions. In addition, optimization for the average refractive power (transmission power) with respect to transmitted light beams and optimization for astigmatism (transmission astigmatism) with regard to transmitted light beams may be further implemented in conjunction with transmitted light beams traveling through points other than the far vision reference point and the near vision reference point.

Figure 2A:
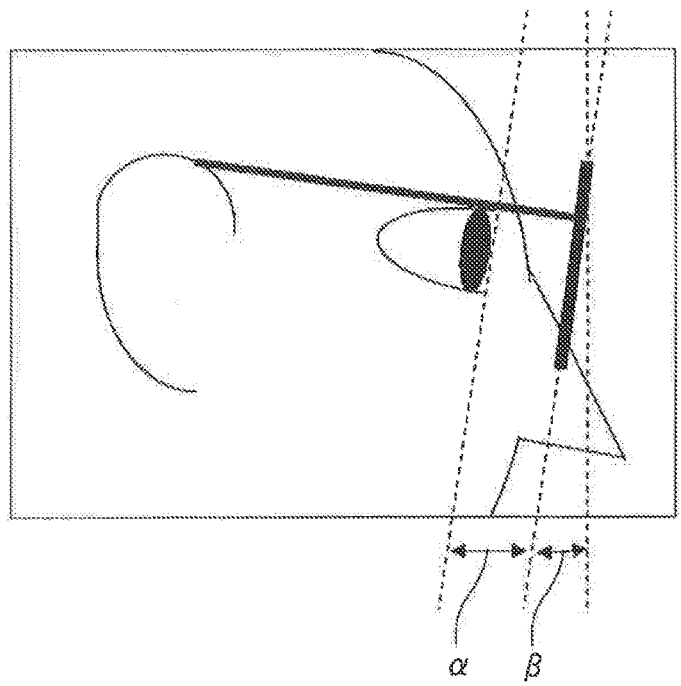
FIG. 2A shows a diagram illustrating a corneal vertex distance and a pantoscopic tilt and FIG. 2B shows a diagram illustrating a face form angle.
Figure 2B:
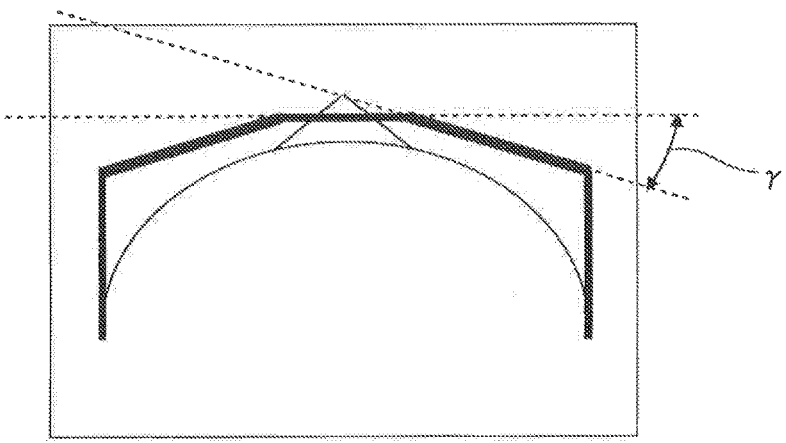

The positional relationship between the eye and the lens used in this optimization must match the positional relationship between the eye of the actual eyeglass wearer and the lens. Accordingly, wearing condition parameters indicating the positional relationship between the eye of the eyeglass wearer and the lens are set for purposes of the optimization. The wearing condition parameters will be explained in reference to FIG. 2. FIG. 2(a) shows the eyeglass wearer wearing eyeglasses, viewed from a side. The distance between the vertex of the cornea of the eyeglass wearer and a prism reference point of the lens will be referred to as a corneal vertex distance $\alpha$ (unit; mm), and the angle formed with a normal and a horizontal line at the prism reference point will be referred to as a pantoscopic tilt $\beta$ (unit: degree). FIG. 2(b) shows the eyeglass wearer viewed from above. The angle formed by the lens surface and a line connecting the left eye and the right eye will be referred to as a face form angle $\gamma$ (unit: degree).

Figure 3A:
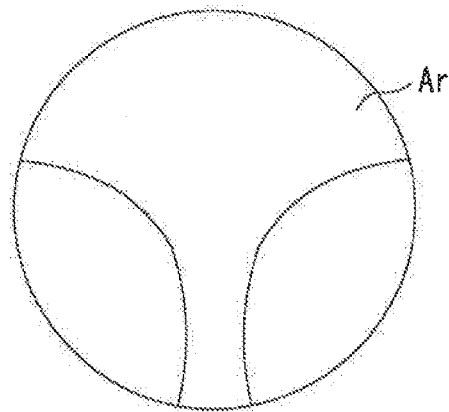
FIG. 3A shows an example of distribution of an area where transmission astigmatism is reduced on a far vision priority-type progressive power lens and FIG. 3B shows an example of distribution of an area where transmission astigmatism is reduced on a near vision priority-type progressive power lens.
Figure 3B:
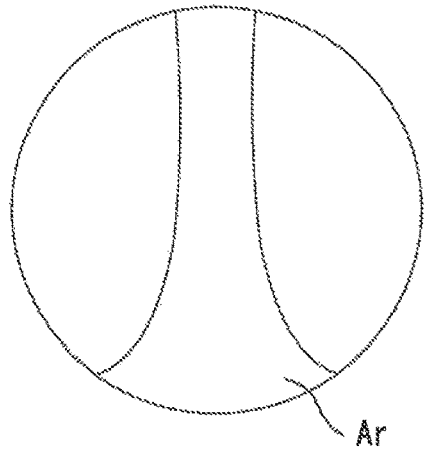

In addition, prior to the optimization, a specific eye lens type is selected. The eyeglass type selection will be described next. A progressive power lens is characterized by the transmission power distribution and the transmission astigmatism distribution over the far-vision portion and over the near-vision portion, and these distributions and the balance thereof vary from one product to another. FIG. 3(a) presents an example of a distribution of a transmission astigmatism-reducing region Ar in a far vision priority-type progressive power lens, whereas FIG. 3(b) presents an example of a distribution of a transmission astigmatism-reducing region Ar in a near vision priority-type progressive power lens. As FIG. 3(a) indicates, the transmission astigmatism-reducing region Ar is set so as to range widely over the far-vision portion in a far vision priority-type progressive power lens LS. In contrast, the transmission astigmatism-reducing region Ar is set so as to range widely over the near-vision portion in the near vision priority-type progressive power lens LS, as indicated in FIG. 3(b). In addition, with regard to transmission power, a specific region for transmission power is set so as to range widely over the far-vision portion in the far vision priority-type progressive power lens, whereas a specific region for transmission power is set so as to range widely in the near-vision portion in the near vision priority-type progressive power lens. In other words, the transmission power and the transmission astigmatism take on distributions representing the characteristics of a specific lens type. Thus, target transmission power distribution and transmission astigmatism distribution set for the optimization vary from one lens type to another.

A progressive power lens may be designed through optimization as described below. First, prescription requirements (such as a spherical diopter power, an astigmatic power, an astigmatic axis, an addition power and the like) for the eyeglass wearer are set. In addition, a specific lens type and a progressive zone length are set in correspondence to the lifestyle of the eyeglass wearer and the purpose of eyeglass use. The wearing condition parameters particular to the eyeglass wearer are measured and set. The wearing condition parameters, related to the eyeglass wearing conditions in which the eyeglass wearer wears eyeglasses, indicate a positional relationship between the eyeglass lens and the eyeball of the eyeglass wearer, such as the corneal vertex distance, the face form angle and the pantoscopic tilt of the lens. Furthermore, lifestyle/habit parameters are set as needed. The term "lifestyle/habit parameters" refers to parameters related to the lifestyle and the habits of the eyeglass wearer and may indicate, for instance, how the eyeglass wearer normally looks at objects in everyday life (e.g., how his line-of-sight moves). Then, the particular type of lens and the progressive zone length having been set as described above are optimized based upon the prescription requirements, the wearing condition parameters and the lifestyle/habit parameters so as to design an optimized contour for the lens surface.

Optimization in progressive power lens design is executed through computer simulation (e.g., the method of damped least squares (DLS method) or a genetic algorithm). In optimization through DLS, for instance, an optimization parameter such as a weighting factor or a damping factor is set at a plurality of evaluation points set on the lens surface. Then, the differences between the optical performance values measured at the evaluation points on the lens surface and corresponding target optical performance values are individually weighted and the progressive power lens is designed by altering the lens surface contour so as to minimize the merit function determined by the sum of squares of the weighted values and the damping factor.

—First Embodiment—

Figure 4:
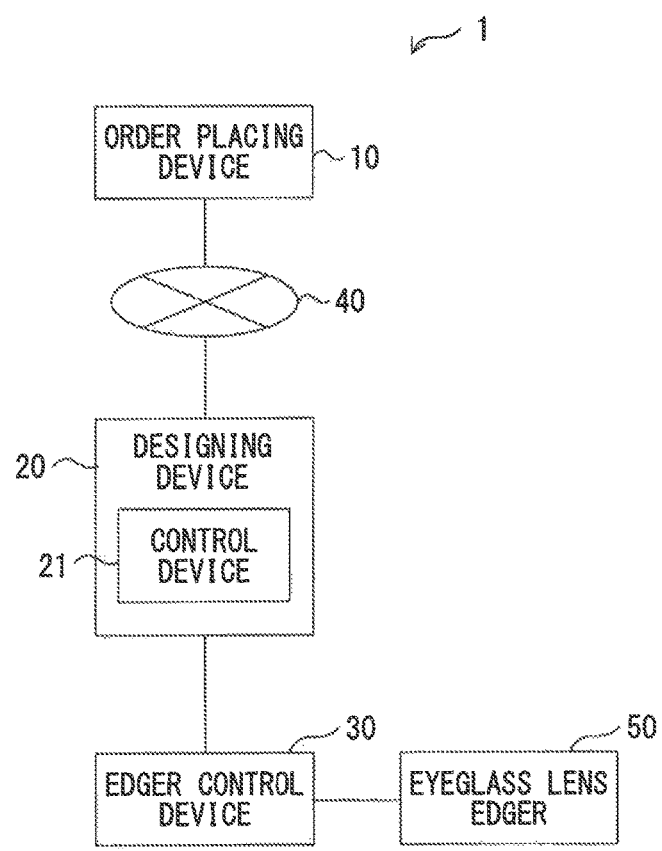
FIG. 4 shows a diagram illustrating the configuration of an eyeglass lens design system achieved in an embodiment of the present invention.

The first embodiment of the present invention will be described next. FIG. 4 is a diagram illustrating the configuration of an eyeglass lens design system 1 achieved in the embodiment. The design system 1 comprises an order placing device 10 configured with a computer that is engaged in eyeglass lens order placement processing, a designing device 20 configured with a computer that is engaged in eyeglass lens design processing and an edger control device 30 configured with a computer engaged in control of an eyeglass lens edger. The order placing device 10 may be installed at, for instance, an eyewear retailer. The designing device 20 and the edger control device 30 may be installed at, for instance, an eyeglass manufacturing factory. The order placing device 10 and the designing device 20 are connected with each other via a communication line 40 such as the Internet. In addition, the edger control device 30 is connected to the designing device 20, and an eyeglass lens edger 50 is connected to the edger control device 30. It is to be noted that the designing device 20 includes a control device 21 configured with a microprocessor and its peripheral circuits. The control device 21 executes eyeglass lens design processing by executing a design program stored in a ROM (not shown). In addition, the microprocessor included in the control device 21, which may be a multiple-processor system or a multi-core processor, is capable of parallel processing.

Figure 5:
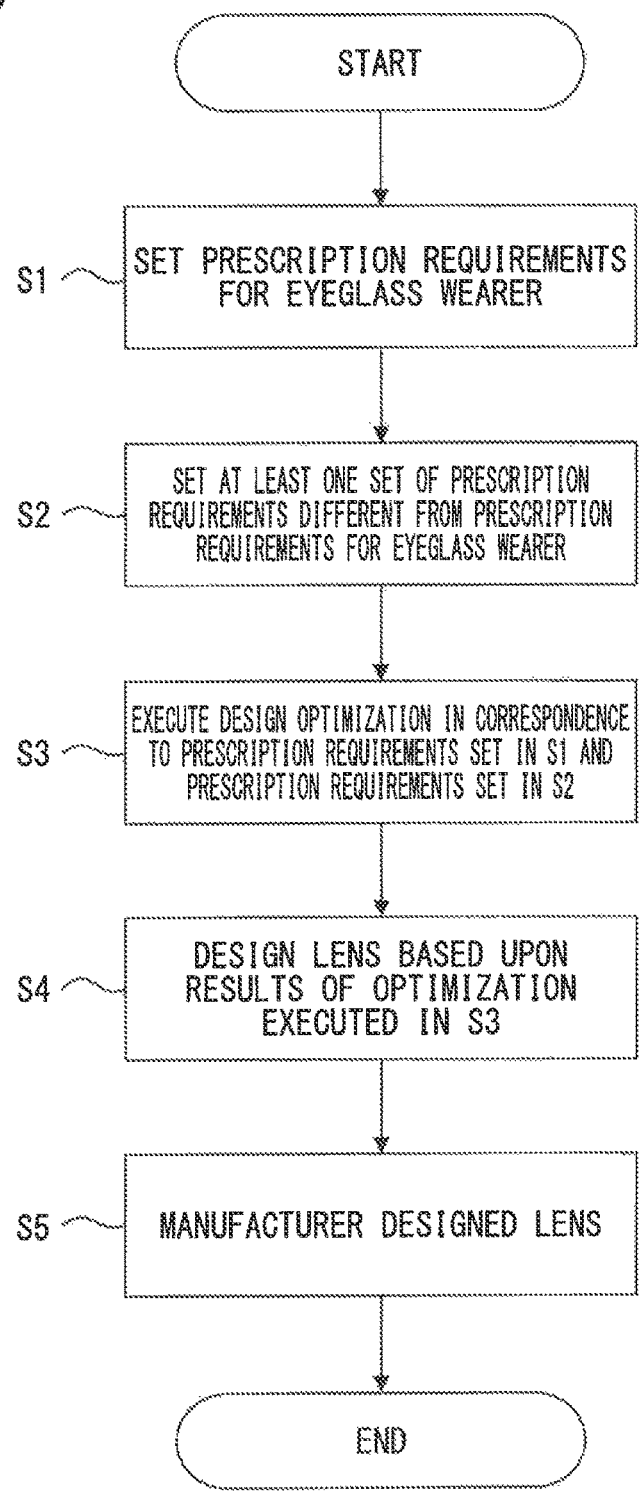
FIG. 5 shows a flowchart of the eyeglass lens design procedure achieved in a first embodiment.

Next, the eyeglass lens design procedure implemented in the embodiment will be explained in reference to the flowchart presented in FIG. 5. In step S1, a sales person at an eyewear store sets prescription requirements (spherical diopter power (S), astigmatic power (or cylindrical power) (C), astigmatic axis (Ax), addition power (Add) and the like) pertaining to the eyeglass wearer, to which the eyeglass lens being ordered is to conform, and enters the prescription requirements into the order placing device 10 via an input device. It is to be noted that the prescription requirements are set based upon, for instance, the results of an eye examination conducted on the eyeglass wearer. The order placing device 10 transmits the prescription requirements having been entered by the sales person at the eyewear store, to the designing device 20 via the communication line 40.

In step S2, the designing device 20 generates at least one set of prescription requirements that substantially match the prescription requirements having been transmitted from the order placing device 10 but is, at the same time, at least partially different. Namely, it generates prescription requirements different from the prescription requirements for the eyeglass wearer but still can be considered substantially identical. Prescription requirements may be regarded to be substantially identical if, for instance, they indicate values falling within a range over which a single value is measured on a lens meter or the difference between these values is within a range defined as an allowable refractive power difference (e.g., within a range of ±0.12 (D)) in the JIS standard (T7315:2006). In optimization, even a very small change in a value representing a prescription requirement results in a different design solution and alters the length of time required for the optimization. This means that the length of time required for the optimization executed for a set of prescription requirements is bound to be different from the length of time required for optimization executed for a set of prescription conditions that can be regarded to be substantially identical if any of the prescription requirements indicate a different value.

For instance, pattern 1 "S-5.75, C-1.25, Ax-43.59, Add 2.5" may represent the prescription requirements for the eyeglass wearer. In this case, the following four patterns, for instance, representing prescription requirements that can be regarded as substantially identical to the prescription requirements for the eyeglass wearer but are at least partially different may be generated.

Pattern 2 "S-5.7501, C-1.25, Ax-43.59, Add 2.5"
Pattern 3 "S-5.75, C-1.2501, Ax-43.59, Add 2.5"
Pattern 4 "S-5.75, C-1.25, Ax-43.60, Add 2.5"
Pattern 5 "S-5.81, C-1.25, Ax-43.59, Add 2.5"

It is to be noted that pattern 2 is distinguishable from the prescription requirements for the eyeglass wearer (pattern 1) in the spherical diopter power (S), which is different by 0.0001. Pattern 3 is distinguishable from the prescription requirements for the eyeglass wearer (pattern 1) in the astigmatic power (C), which is different by 0.0001. Pattern 4 is distinguishable from the prescription requirements for the eyeglass wearer (pattern 1) in the astigmatic axis (Ax), which is different by 0.01. Pattern 5 is distinguishable from the prescription requirements for the eyeglass wearer (pattern 1) in the astigmatic power (C), which is different by 0.06.

The manner with which prescription requirement patterns are set as described above simply represents an example and the quantity of prescription requirement patterns that may be generated and values that may be taken for individual prescription requirements are not limited to those indicated above. The quantity of prescription requirement patterns to be internally generated at the designing device 20 may be determined through testing or it may be automatically determined. In addition, a fixed quantity of prescription requirement patterns may be internally generated regardless of the prescription requirements for the eyeglass wearer transmitted from the order placing device 10 or the quantity of prescription requirement patterns to be internally generated may be adjusted in correspondence to the prescription requirements of the particular eyeglass wearer.

In step S3, the designing device 20 obtains design solutions by executing optimization for the prescription requirements for the eyeglass wearer having been transmitted from the order placing device 10 and the various sets of prescription requirements generated in step S2 as described above. In other words, optimization is executed in correspondence to each of the five patterns, i.e., the prescription requirements for the eyeglass wearer (pattern 1) and the prescription requirements generated through step S2 (pattern 2 through pattern 5), so as to obtain design solutions each corresponding to one of the patterns. As a result, sets of eyeglass lens design data (design solutions), the number of which matches the quantity of patterns having undergone the optimization processing, are obtained.

Figure 6:
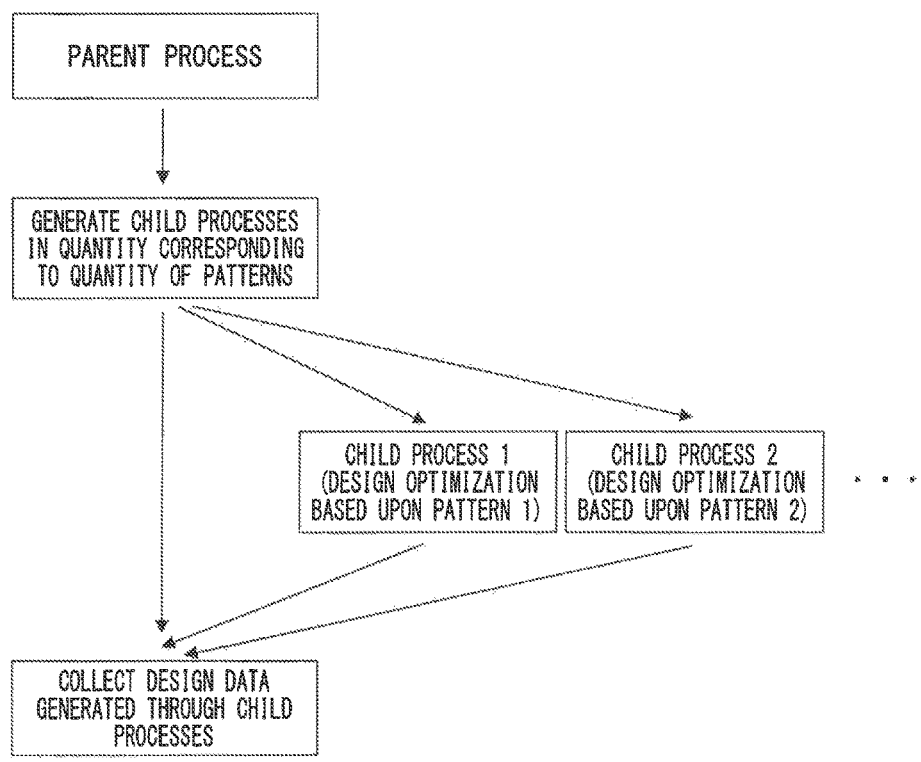
FIG. 6 shows a diagram illustrating the parallel processing.

The designing device 20 executes the optimization for the plurality of patterns through parallel processing. FIG. 6 illustrates how such parallel processing may be executed. It is to be noted that while the parallel processing is executed as processes in the illustration presented in FIG. 6, it may be executed in a similar manner in threads. As FIG. 6 indicates, in a parent process in the design program, the designing device 20 generates child processes (child process 1 through child process N) in a quantity matching the quantity of processing requirement patterns having been generated and starts them up. At startup, one of the plurality of prescription requirement patterns (pattern 1 through pattern N) having been set in step S3 is input to each child process. In each child process, an optimization calculation is executed by using the prescription requirement pattern input thereto and a design solution is obtained independently of the other child processes. Namely, optimization calculations corresponding to the plurality of prescription requirement patterns are executed in parallel. For instance, optimization is executed in conjunction with the prescription requirement pattern 1 in child process 1, whereas optimization is executed in conjunction with the prescription requirement pattern 2 in child process 2. Each child process ends once the optimization is completed.

The parent process monitors the length of time having elapsed following startup of the child processes (i.e., following the start of the optimization), and once the elapsing time exceeds a predetermined time limit, the parent process suspends the processing underway in any child process where the optimization has not been completed. It is to be noted that the time limit may be determined based upon the length of time required for a successful optimization or it may be determined by executing statistical processing on the lengths of time required for optimization in correspondence to a plurality of sets of prescription requirements. As an alternative, the elapsing time may be monitored by each child process, which may then suspend the processing once the elapsing time exceeds the time limit. As a further alternative, the parent process may generate a separate child process specifically for purposes of time management so that the child process monitors the length of time having elapsed following the optimization start and, once the elapsing time length exceeds the predetermined time limit, suspends the processing underway in any child process where the optimization is not completed.

The parent process obtains data indicating the design solution obtained in each process where the optimization has been completed before the time limit, through process-to-process communication or via a file. It is to be noted that the parent process obtains data of a type common to all the child processes through a common method from each child process.

As described above, the designing device 20 executes the optimization processing in parallel in correspondence to the prescription requirements for the eyeglass wearer and the prescription requirements generated through step S2, as described earlier. Once the length of time having elapsed following the optimization start exceeds the predetermined time limit, the designing device 20 suspends the optimization for any set of prescription requirements with respect to which the optimization has not been completed and obtains design solutions in correspondence to the prescription requirements with respect to which the optimization has been completed.

In step S4, design data for the eyeglass lens to be provided to the eyeglass wearer are generated by using the design solutions obtained in step S3 in correspondence to the prescription requirements for which optimization has been completed. The design data may be generated through any of the following methods.

For instance, the optimized design solution obtained in correspondence to the prescription requirements closest to the prescription requirements for the eyeglass wearer having been transmitted from the order placing device 10, among the prescription requirements for which the optimization has been completed in step S3 may be used as the design data for the eyeglass lens to be provided to the eyeglass wearer.

As an alternative, design data for the eyeglass lens to be provided to the eyeglass wearer may be generated through statistical processing, such as averaging or weighted averaging, executed on the design solutions obtained in step S3 in correspondence to the prescription requirements for which the optimization has been completed.

As a further alternative, a design solution matching the prescription requirements for the eyeglass wearer, calculated by interpolating the design solutions corresponding to the prescription requirements for which the optimization has been completed in step S3, may be used as the design data for the eyeglass lens to be provided to the eyeglass wearer.

As yet another alternative, the design solution assuring the best optical performance among the design solutions obtained in correspondence to the prescription requirements for which the optimization has been completed in step S3 may be used as the design data for the eyeglass lens to be provided to the eyeglass wearer.

In step S5, the designing device 20 outputs the design data generated in step S4 to the edger control device 30. Based upon the design data output from the designing device 20, the edger control device 30 issues an edging instruction to the eyeglass lens edger 50. The eyeglass lens edger 50 machines the eyeglass lens based upon the edging instruction and thus an eyeglass lens is manufactured based upon the design data generated in step S4.

It is to be noted that in information exchange between the parent process and the plurality of child processes carried out for the parallel processing described above, the child processes each simply need to provide the parent process with values taken for optimization parameters (parameter values indicating the lens surface contour achieved through the optimization, i.e., indicating the optimization results) and an evaluation value obtained by evaluating the optical performance (transmission astigmatism) achieved as the optimization results. This means that an evaluation calculation is also executed in each child process after the optimization is completed. The evaluation calculations, executed through parallel processing, can be completed in a length of time equal to that required for a single evaluation calculation. The volume of information exchanged may be minimized by allowing each child process to provide the parent process with values to be taken for the optimization parameters alone. In this case, while the volume of information exchanged can be minimized, the optimization results provided by the child processes must be evaluated in the parent process. In either case, parameter value candidates to be used as the final design results, i.e., the design solution assuring the best possible performance, can be selected through this evaluation.

The following advantages and operations are achieved through the first embodiment described above.

(1) In the eyeglass lens design method achieved in the first embodiment, prescription requirements for the eyeglass wearer are set, at least one set of prescription requirements at least partially different from the prescription requirements for the eyeglass wearer is generated and eyeglass lens contour optimization is executed individually in correspondence to the prescription requirements for the eyeglass wearer and the prescription requirements generated as described above. This means that a design solution can be obtained as long as the optimization is completed in correspondence to any set of prescription requirements generated as described above before the time limit is up, even if the optimization executed in correspondence to the prescription requirements for the eyeglass wearer cannot be completed before the time limit. The eyeglass lens can then be designed by using the design solution corresponding to the prescription requirements for which the optimization has been completed. Thus, the likelihood of failure in obtaining a design solution through optimization can be reduced in the embodiment.

(2) In the eyeglass lens design method achieved in the first embodiment, prescription requirements that are at least partially different from the prescription requirements for the eyeglass wearer but still can be considered as substantially identical, are generated. Thus, even if the optimization corresponding to the prescription requirements for the eyeglass wearer cannot be completed before the time limit is up, a design solution substantially satisfying the prescription requirements for the eyeglass wearer can be obtained as long as the optimization is completed in correspondence to any set of prescription requirements generated as described above before the time limit is up.

(Variations of the First Embodiment)

In the embodiment described above, prescription requirements that are at least partially different from, but can be regarded as substantially identical to, the prescription requirements for the eyeglass wearer, are generated in step S2. However, optimization may be executed by generating a pattern of prescription requirements that are significantly different from, and thus cannot be regarded as substantially identical to, the prescription requirements for the eyeglass wearer. In such a case, the designing device 20 may obtain a design solution through optimization executed by using the prescription requirements different from the prescription requirements for the eyeglass wearer and then execute correction processing so as to adjust the design solution toward or more in line with the prescription requirements for the eyeglass wearer.

The correction processing executed in this case may be, for instance, power correction. Namely, if the optimization has been executed in correspondence to prescription requirements indicating power different from that indicated in the prescription requirements for the eyeglass wearer, the design solution obtained through the optimization may be corrected so as to achieve the power indicated in the prescription requirements for the eyeglass wearer. Design data for the eyeglass lens to be provided to the eyeglass wearer may then be generated by using the design solutions that have undergone the power correction. For instance, the design solution assuring the best optical performance among design solutions resulting from power correction, may be used as design data for the eyeglass lens to be provided to the eyeglass wearer. It is to be noted that the design solution assuring the best optical performance among design solutions that have not undergone power correction, may first be selected, power correction may then be executed on the selected design solution and the resulting design solution may be used as the design data for the eyeglass lens to be provided to the eyeglass wearer.

In the embodiment described above, the parent process may monitor the progress of the optimization underway in each child process so as to ensure that expected results are obtained within an anticipated length of time in correspondence to the progress status. The optimization is executed through a plurality of steps and a normal processing time length required to execute each step can be ascertained in advance. Accordingly, if it becomes obvious that the optimization is not progressing at the expected rate in comparison to the normal processing time length, the optimization may be completed within the expected time length by, for instance, skipping a later step of the optimization (e.g., a step in the final stage). In addition, as a specific means for keeping track of the optimization progress, each child process may report to the parent process the status of the optimization progress (such as the number of optimization sessions executed so far, the current optical performance, and the progress rate). As an alternative, the parent process may issue an inquiry to each child process for the status of the optimization. As a further alternative, the child process may save a file recording the status of the optimization executed therein and the parent process may check the file.

In the embodiment described above, additional prescription requirements that are at least partially different from, but can be regarded as substantially identical to, the prescription requirements for the eyeglass wearer, are generated and optimization is executed through parallel processing by individually using a plurality of patterns of prescription requirements. However, the optimization may instead the executed in series. In such a case, if the optimization executed in correspondence to the prescription requirements for the eyeglass wearer cannot be completed before the predetermined time limit is up, the optimization may be halted and then optimization may be executed in correspondence to a set of different prescription requirements having been generated.

—Second Embodiment—

Next, the second embodiment of the present invention will be described. The essential features of the second embodiment will first be outlined. As explained earlier, the wearing condition parameters are set for optimization of an eyeglass lens. The wearing condition parameters corresponding to a given eyeglass wearer are normally measured at an eyewear store. The measurement may be conducted on a special machine or by a person. The wearing condition parameters are crucial parameters based upon which the positional relationship between the eye and the lens is set when optimizing the transmission power. This means that the person measuring the wearing condition parameters must be very careful and that the eyeglasses wearer must wear the eyeglasses under normal wearing conditions.

As long as the eyeglass wearer is able to keep the eyeglass lens, optimized by using the wearing condition parameters measured as described above, in a position matching the position taken during the wearing condition parameter measurement, optimal performance will be sustained. However, the eyeglasses may slide down during regular use as the wearer moves, sweats and so forth. The eyeglasses may slide down even while the wearer is seated. In other words, while both the person measuring the wearing condition parameters and the eyeglass wearer are likely to be careful during the measurement, the eyeglass wearing conditions during the wearing condition parameter measurement may be different from the eyeglass wearing conditions in everyday use.

In addition, the characteristics of the optimization are such that optimization processing is achieved in correspondence to the parameter value used in the optimization processing but the integrity of the optimization cannot be sustained if a deviation from the particular parameter values occurs. For this reason, if the wearing condition parameters during regular use deviate from the wearing condition parameters used for the optimization, the performance of the eyeglass lens will be greatly compromised.

In order to address this issue, wearing condition parameter values deviating from the wearing condition parameter values obtained through measurement are also used so as to execute optimization in correspondence to the measured wearing condition parameter values and the deviating wearing condition parameter values in the eyeglass lens design method achieved in the second embodiment. Based upon a plurality of design solutions obtained through the optimization executed in correspondence to the plurality of sets of wearing condition parameter values, a lens assuring robust integrity of performance even through changes in the wearing conditions can be realized.

Furthermore, the optimization is executed in correspondence to the plurality of patterns through parallel processing in the embodiment. The optimization processing requires a considerable length of time and, at present, the eyeglass wearer will have to wait for his order to be filled over an extended period of time if a plurality of optimization sessions are to be executed. For this reason, a robust lens that performs well through changes in the wearing conditions, designed through optimization executed in conjunction with a plurality of patterns, is not presently available. Accordingly, the optimization is executed in conjunction with a plurality of patterns through parallel processing in the embodiment so that the entire optimization processing is completed over a length of time substantially the same as that required for optimization executed in correspondence to a single pattern.

The eyeglass lens design method achieved in the second embodiment will be described in specific detail below. It is to be noted that the configuration of the design system used in the second embodiment is similar to the configuration of the design system 1 (FIG. 1) in the first embodiment and a repeated explanation will not be provided.

Figure 7:
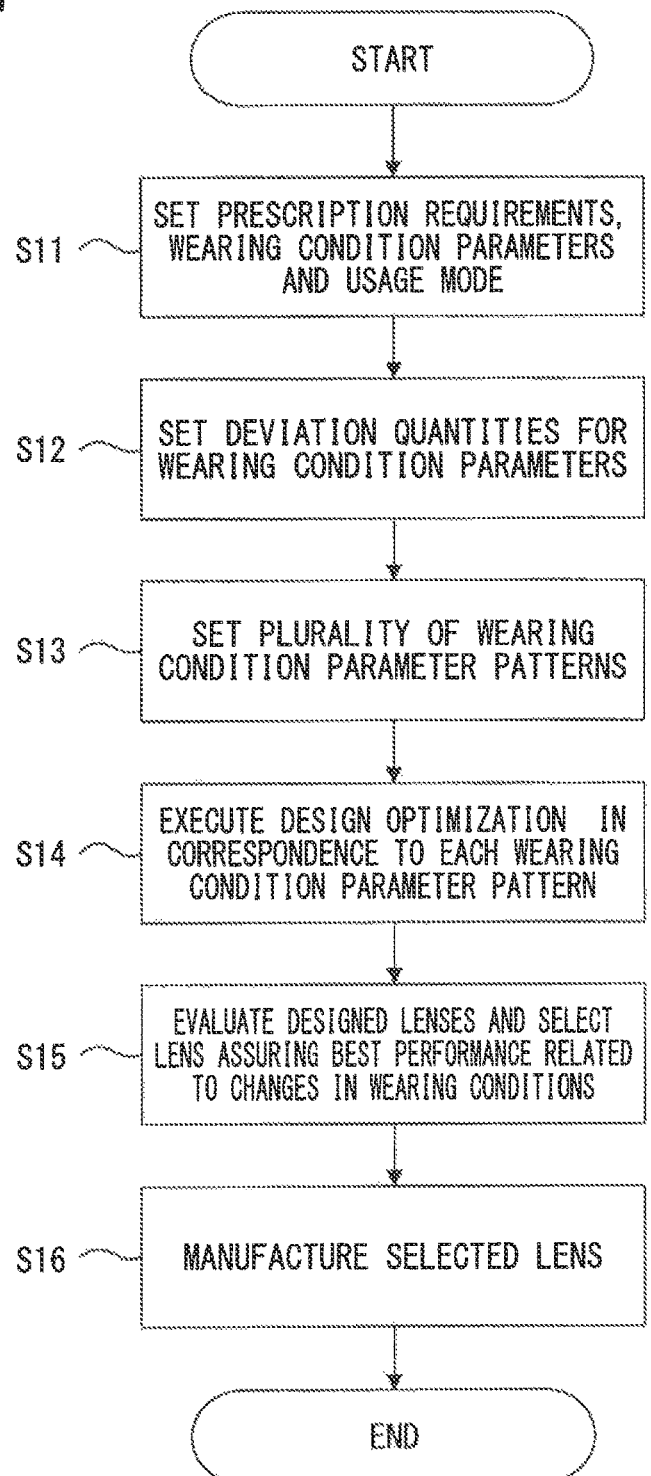
FIG. 7 shows a flowchart of the eyeglass lens design procedure achieved in a second embodiment.

The eyeglass lens design procedure implemented in the second embodiment will be explained in reference to the flowchart presented in FIG. 7. In step S11, a sales person at an eyewear store sets prescription requirements pertaining to the eyeglass wearer, to which the eyeglass lens being ordered is to conform, wearing condition parameters and an eyeglass lens usage mode, and enters the information thus set into the order placing device 10 via an input device.

It is to be noted that the prescription requirements are set based upon, for instance, the results of an eye examination conducted on the eyeglass wearer. As the wearing condition parameters, various types of wearing condition parameters are measured and set by, for instance, photographing the eyeglass wearer actually wearing an eyeglass frame in which the eyeglass lenses are to be fitted from front and a side with a digital camera or the like and then analyzing the captured photographic images. The eyeglass lens usage mode may be set by, for instance, interviewing the eyeglasses wearer and selecting an option corresponding to the scene the eyeglass wearer is likely to use the eyeglass lens, among a plurality of preselected options. For instance, if the eyeglass wearer indicates that the eyeglasses will be mainly used for paperwork, an option "paperwork" may be selected, if he indicates that he is likely to move around while wearing the eyeglasses, an option "active" may be selected and if he indicates that he will play sports while wearing the eyeglasses, and option "sports" may be selected.

The order placing device 10 transmits the prescription requirements, the wearing condition parameters and the usage mode having been entered by the sales person at the eyewear store into the designing device 20 via the communication line 40.

In step S12, the designing device 20 sets deviation quantities indicating the extents of deviation to be applied to the wearing condition parameters in correspondence to the usage mode transmitted from the order placing device 10. For instance, if the usage mode is "paperwork", the eyeglasses are not expected to shift significantly on the wearer's face and accordingly, smaller values are set as the deviation quantities for the wearing condition parameters. If, on the other hand, the usage mode is "active" or "sports", the eyeglasses are expected to shift considerably on the wearer's face and accordingly, greater values are set as the deviation quantities for the wearing condition parameters. In addition, when the wearer is engaged in paperwork or is moving around, the eyeglasses may shift along the direction in which gravitational force is applied but the face form angle is not expected to change. Accordingly, if the usage mode is "paperwork" or "active", deviation quantities are set for the corneal vertex distance and the pantoscopic tilt but no deviation quantity is set for the face form angle. However, when a person plays a sport, the head is likely to move about greatly and thus, the face form angle is expected to change. For this reason, if the usage mode is "sports" a deviation quantity is set for the face form angle in addition to the deviation quantities for the corneal vertex distance and the pantoscopic tilt.

In step S13, the designing device 20 sets wearing condition parameter values calculated by adding/subtracting the deviation quantities set in step S2 to/from the wearing condition parameters (hereafter referred to as specified wearing condition parameters) having been transmitted from the order placing device 10 (i.e., the wearing condition parameters measured on the eyeglass wearer), in addition to the specified wearing condition parameters, as wearing condition parameters to be used for eyeglass lens optimization. For instance, if "paperwork" has been selected as the usage mode, five different wearing condition parameter patterns, one representing the specified wearing condition parameters, two wearing condition parameter patterns achieved by altering the corneal vertex distance in the specified wearing condition parameters by ±0.5 mm and two wearing condition parameter patterns achieved by shifting the pantoscopic tilt in the specified wearing condition parameters by ±0.5° are set. It is to be noted that nine (3 corneal vertex distance values×3 pantoscopic tilt values) wearing condition parameter patterns each representing a combination of a corneal vertex distance selected from the three different values (i.e., the specified value and the values deviating from the specified value by ±0.5 mm) and a pantoscopic tilt selected from the three different values (i.e., the specified value and the values deviating from the specified value by ±0.5°), may be set instead. In other words, a plurality of wearing condition parameter patterns (at least one pattern in addition to the specified wearing condition parameter pattern) to be used for the eyeglass lens optimization are set in step S13.

In step S14, the designing device 20 executes the optimization by using the prescription requirements having been transmitted from the order placing device 10 and the plurality of wearing condition parameter patterns set in step S13. In this step, optimization is executed in correspondence to each wearing condition parameter pattern so as to obtain design solutions for the individual patterns. As a result, sets of design data for the eyeglass lens (design solutions), the number of which matches the quantity of patterns set in step S13, are obtained. In addition, the designing device 20 executes optimization for the plurality of wearing condition parameter patterns through parallel processing (see FIG. 6), as in the first embodiment explained earlier. Namely, in the parent process, child processes are generated in a quantity matching the quantity of wearing condition parameter patterns set in step S13, and a design solution is obtained through an optimization calculation executed independently in each of the child processes by using the wearing condition parameter values input thereto. Through these measures, optimization corresponding to the plurality of wearing condition parameter patterns can be completed within a processing time length substantially the same as the processing time required for optimization of a single wearing condition parameter pattern.

In step S15, the designing device 20 evaluates aberration at the plurality of eyeglass lenses designed in step S14 and selects a single eyeglass lens that is judged to assure the best overall performance through a range of changes in the eyeglass wearing conditions, among the plurality of eyeglass lenses, based upon the evaluation results, as the eyeglass lens to be provided to the eyeglass wearer. The evaluation and the selection may be made through any of various methods. For instance, the extent to which the aberration will change when each eyeglass lens is placed at a position offset from the position indicated by the specified wearing condition parameters may be calculated and the eyeglass lens with the least change may be selected. As an alternative, a weighted average value representing the aberration that would occur with each eyeglass lens placed at the position indicated by the specified wearing condition parameters and the aberration that would occur with it placed at a position offset from the position indicated by the specified wearing condition parameters may be calculated and the eyeglass lens with the smallest value calculated for the weighted average may be selected. In such a case, greater weight may be applied to the aberration occurring at the position indicated by the specified wearing condition parameters.

In step S16, the designing device 20 outputs the design data for the eyeglass lens selected in step S5 to the edger control device 30. Based upon the design data output from the designing device 20, the edger control device 30 issues an edging instruction to the eyeglass lens edger 50. The eyeglass lens edger 50 machines the eyeglass lens based upon the edging instruction and thus an eyeglass lens is manufactured based upon the design data for the eyeglass lens selected in step S15. As a result, an eyeglass lens assuring good performance even when the wearing conditions change can be provided to the eyeglass wearer.

Next, a specific example in which an eyeglass lens is designed through the design method described above will be explained. In the description of this example, the wearing condition parameters are notated as (pantoscopic tilt [°], corneal vertex distance [mm]). For instance, wearing condition parameters measured on the eyeglass wearer with an eyeglass lens fitted properly at the eyewear store may be (0, 12). In addition, patterns of wearing condition parameters deviating from these wearing condition parameters, such as (1, 12.5), (2, 13) and (3, 13.5), are set. Optimization is then executed for each of these four patterns (0, 12), (1, 12.5), (2, 13) and (3, 13.5) so as to design eyeglass lenses each corresponding to one of the patterns. The optimization is executed for these four patterns through parallel processing, as has been explained earlier.

Figure 8:
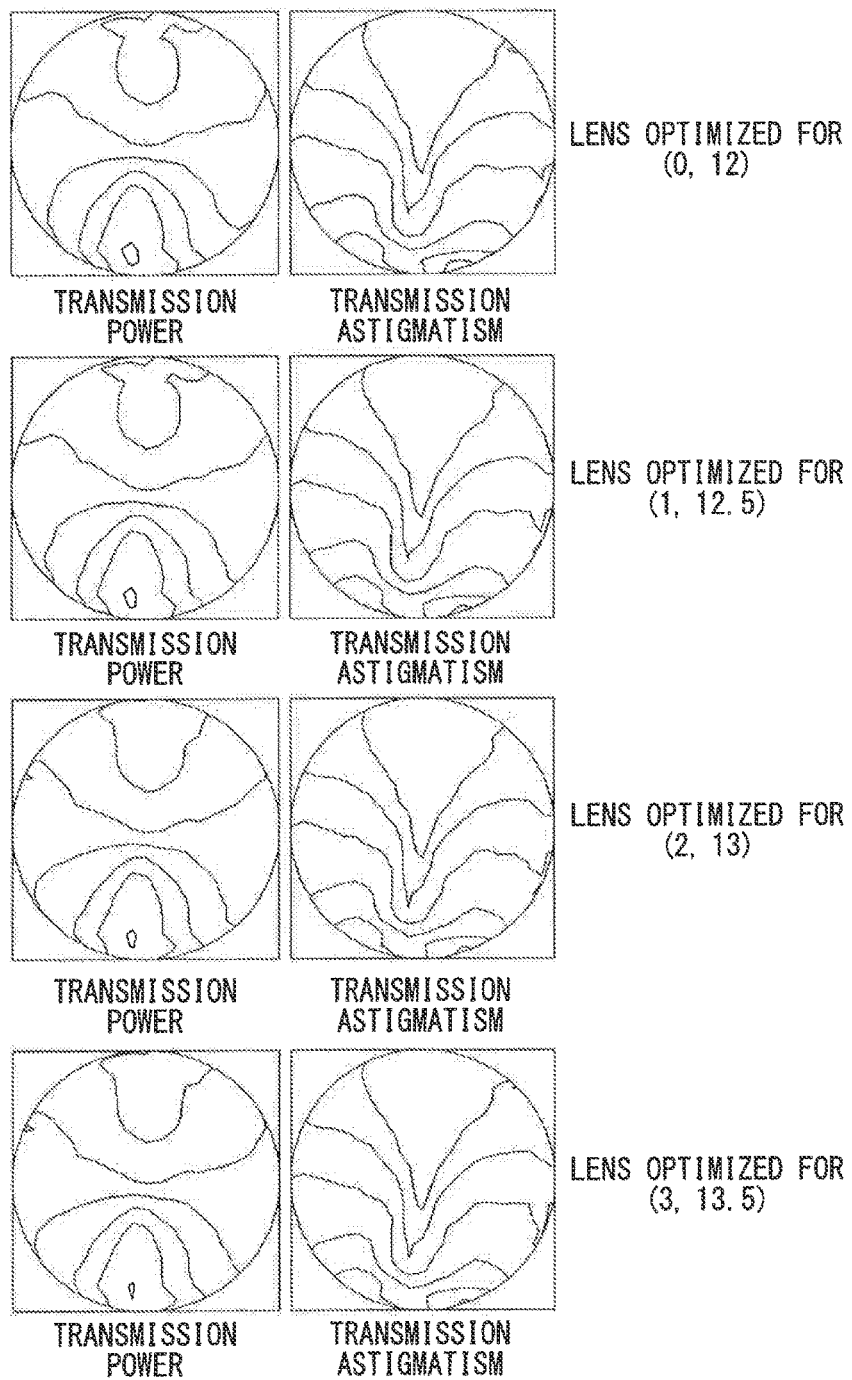
FIG. 8 shows diagrams showing specific instances of transmission power and transmission astigmatism in the second embodiment.
Figure 9:
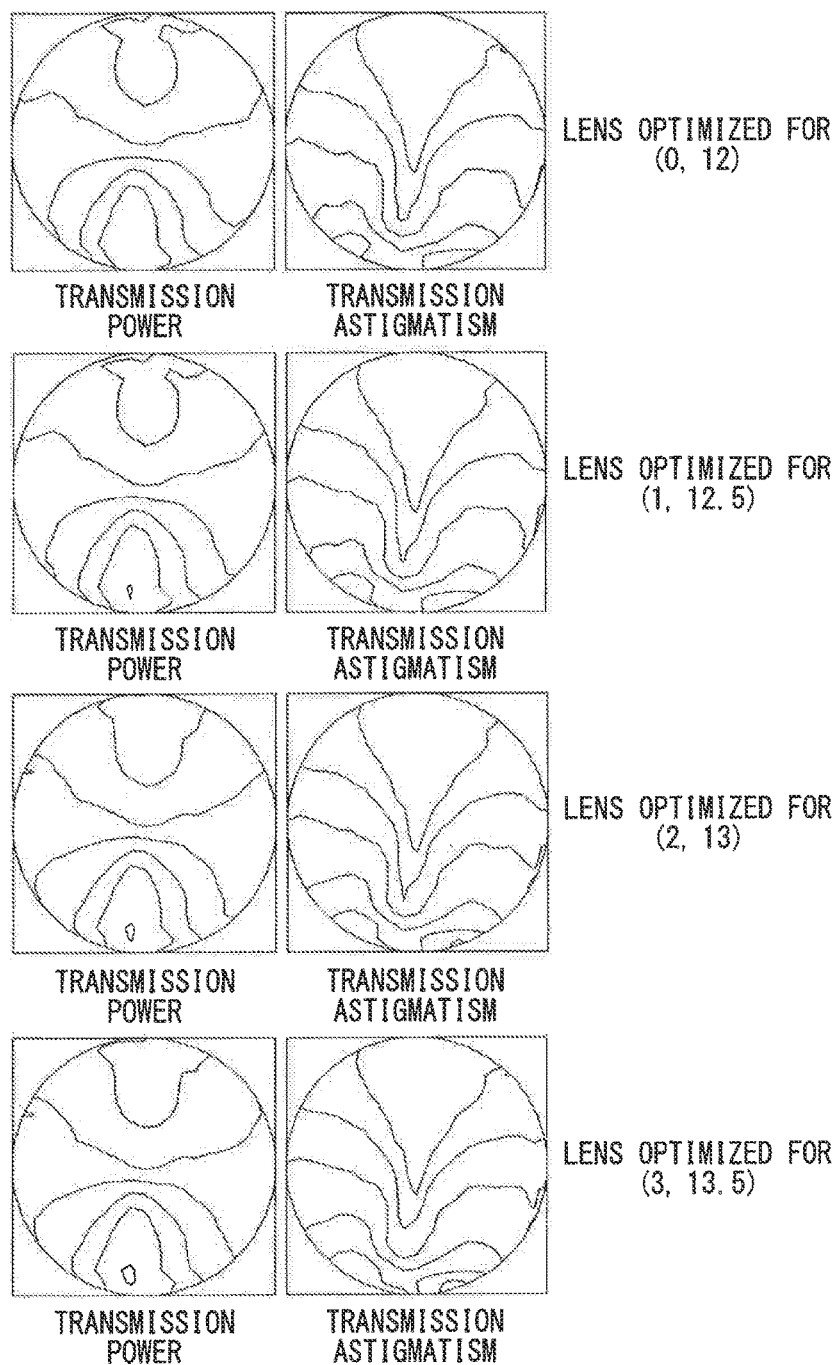
FIG. 9 shows diagrams showing specific instances of transmission power and transmission astigmatism in the second embodiment.

The amounts of aberration at the four eyeglass lenses designed through the optimization executed in correspondence to the four patterns (i.e., the optimized lenses corresponding to the pattern (0, 12), the pattern (1, 12.5), the pattern (2, 13) and the pattern (3, 13.5)), are individually evaluated. FIG. 8 presents diagrams showing the transmission power and the transmission astigmatism at the four eyeglass lenses, each worn in the wearing conditions represented by the wearing condition parameters (0, 12), i.e., in the properly fitted conditions. FIG. 9 presents diagrams showing the transmission power and transmission astigmatism at the four eyeglass lenses, each worn in the wearing conditions represented by the wearing condition parameters (2, 13), i.e., the eyeglasses have slid down by a slight extent. The wearer who tends to sweat readily, who plays sports or who is wearing an ill-fitting nose pad is likely to wear the eyeglasses in these conditions.

Through the aberration evaluation conducted as described above, an eyeglass lens to be provided to the eyeglass wearer is selected from the four eyeglass lenses by taking into consideration how the eyeglass wearer normally wears the eyeglasses, the eyeglass wearer's lifestyle pattern, the shape of the frame (i.e., whether or not the frame tends to slide down readily) and the like.

For instance, the eyeglass wearer may wear the eyeglasses in the wearing conditions represented by the wearing condition parameters (0, 12), i.e., in the properly fitted conditions, over a greater length of time and wear them in the wearing conditions represented by the wearing condition parameters (2, 13), with the eyeglasses slid down slightly over a smaller length of time. For such an eyeglass wearer, the lens, optimized in correspondence to the wearing condition parameters (1, 12.5), which assures good performance in the wearing conditions represented by the wearing condition parameters (0, 12) and sustains a satisfactory level of performance even in the wearing conditions represented by the wearing condition parameters (2, 13), should be recommended.

The eyeglass wearer may give top priority to ensuring that there is no substantial difference in visual perception between the wearing conditions represented by the wearing condition parameters (0, 12), i.e., in the properly fitted conditions, and the wearing conditions represented by the wearing condition parameters (2, 13) with the eyeglasses slid down slightly. In such a case, the lens, optimized in correspondence to the wearing condition parameters (2, 13), which achieves performance with just a slight difference from that of the lens optimized in correspondence to the wearing condition parameters (0, 12), should be recommended.

The following advantages and operations are achieved through the second embodiment described above.

(1) The eyeglass lens design method achieved in the second embodiment comprises a prescription requirement-setting step in which prescription requirements for an eyeglass lens pertaining to an eyeglass wearer are set, a pattern setting step in which a plurality of patterns are set with regard to wearing condition parameters and a designing step in which eyeglass lenses are designed through parallel processing based upon the prescription requirements set in the prescription requirement-setting step, each in correspondence to one of the plurality of patterns set in the pattern setting step. Through this method, eyeglass lenses corresponding to the plurality of wearing condition parameter patterns can be designed over a processing time length substantially the same as the length of processing time required for designing an eyeglass lens in correspondence to a single pattern.

(2) The design method described in (1) above further comprises a deviation quantity setting step in which deviation quantities for the wearing condition parameters are set, and in the pattern setting step, a pattern of wearing condition parameters indicating values measured on the eyeglass wearer and a pattern of wearing condition parameters indicating values deviating from the measured values by the deviation quantities are set. The method further comprises an evaluation/selection step in which the plurality of eyeglass lenses designed in the designing step are evaluated and an eyeglass lens to be provided to the eyeglass wearer is selected based upon the evaluation results. As a result, a robust eyeglass lens assuring good performance even when the wearing conditions change, among the plurality of eyeglass lenses designed by altering the wearing condition parameters, can be selected and provided to the eyeglass wearer.

(Variation 1 of the Second Embodiment)

In step S15 described above, an eyeglass lens among the plurality of eyeglass lenses designed in step S14 is selected. As an alternative, design data for an eyeglass lens to be provided to the eyeglass wearer may be generated by calculating an average or a weighted average of the design data for the plurality of eyeglass lenses designed in step S14. If such design data are to be generated through weighted averaging, greater weight should be applied to the eyeglass lens having been optimized by using, for instance, the specified wearing condition parameter values. In addition, weight to be applied may be determined by taking into consideration the typical usage mode in which the eyeglass wearer wears the eyeglasses. For instance, if the eyeglass wearer frequently plays sports, significant weight may be applied to the patterns other than that representing the specified wearing condition parameters, but if the eyeglass wearer mainly wears the eyeglasses for paperwork, the weight applied to the patterns other than that representing the specified wearing condition parameters may be reduced.

Variation 1 will be described in reference to a specific example. In the description of this example, the wearing condition parameters are notated as (pantoscopic tilt [°], corneal vertex distance [mm]). For instance, the wearing condition parameter values measured on the eyeglass wearer with an eyeglass lens fitted properly at the eyewear store may be (0, 12). The designing device 20 automatically generates patterns of wearing condition parameter values deviating from these wearing condition parameter values, such as (1, 12.5), (2, 13), (3, 13.5), (4, 14) and (5, 14.5). Optimization is then executed for each of these six patterns (0, 12), (1, 12.5), (2, 13), (3, 13.5), (4, 14) and (5, 14.5) so as to design eyeglass lenses each corresponding to one of the patterns. The optimization is executed for these six patterns through parallel processing, as has been explained earlier.

Figure 10A:
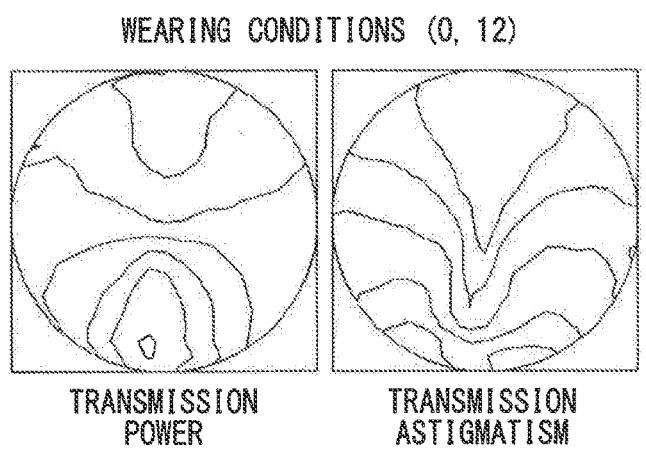
FIG. 10A and FIG. 10B show diagrams showing instances of transmission power and transmission astigmatism in a variation of the second embodiment.
Figure 10B:
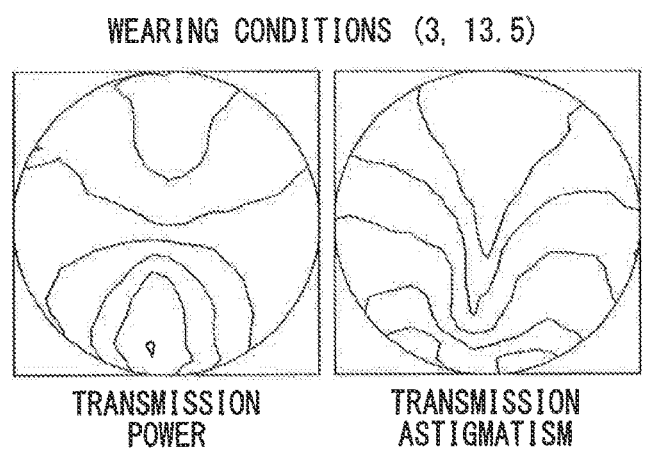

Then, design data for the eyeglass lens to be provided to the eyeglass wearer are generated by averaging the design data for the six eyeglass lenses designed through the optimization executed in correspondence to the six patterns. FIG. 10 presents diagrams showing the transmission power and the transmission astigmatism in an eyeglass lens designed based upon the design data thus generated. FIG. 10(a) indicates the transmission power and the transmission astigmatism that would occur in the wearing conditions represented by the wearing condition parameters (0, 12), i.e., in the properly fitted conditions, whereas FIG. 10(b) indicates the transmission power and the transmission astigmatism that would occur in the wearing conditions represented by the wearing condition parameters (3, 13.5) with the eyeglasses having slid down by a slight extent.

A comparison of FIG. 10(a) and FIG. 10(b) reveals that there is hardly any difference between both the transmission power and the transmission astigmatism in the wearing conditions represented by the wearing condition parameters (0, 12) and the transmission power and the transmission astigmatism in the wearing conditions represented by the wearing condition parameters (3, 13.5). In addition, the addition power under wearing conditions of the eyeglass lens worn in the wearing conditions represented by the wearing condition parameters (0, 12) is 2.01, whereas the addition power in the wearing conditions represented by the wearing condition parameters (3, 13.5) is 2.00. It is to be noted that the addition power specified in the prescription requirements is 2.00. Thus, advantageously, the change that may otherwise occur in the addition power under wearing conditions as the properly fitted eyeglasses become shifted is almost completely eliminated. As a result, the eyeglass wearer is able to clearly see an object at an assumed point at close range even when the eyeglasses have slid down.

Figure 11A:
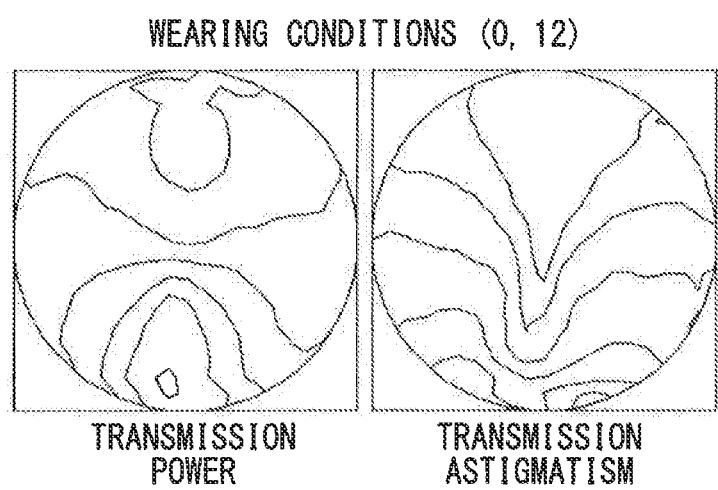
FIG. 11A and FIG. 11B show diagrams showing instances of transmission power and transmission astigmatism in a comparison example for the variation of the second embodiment.

It is to be noted that for purposes of comparison, diagrams showing the transmission power and the transmission astigmatism in the eyeglass lens designed through the optimization executed in correspondence to the wearing condition parameters (0, 12), as in the related art, are presented in FIG. 11. FIG. 11(a) indicates the transmission power and the transmission astigmatism that would occur in the wearing conditions represented by the wearing condition parameters (0, 12), i.e., in the properly fitted conditions, whereas FIG. 1 (b) indicates the transmission power and the transmission astigmatism that would occur in the wearing conditions represented by the wearing condition parameters (3, 13.5) with the eyeglasses having slid down by a slight extent.

Figure 11B:
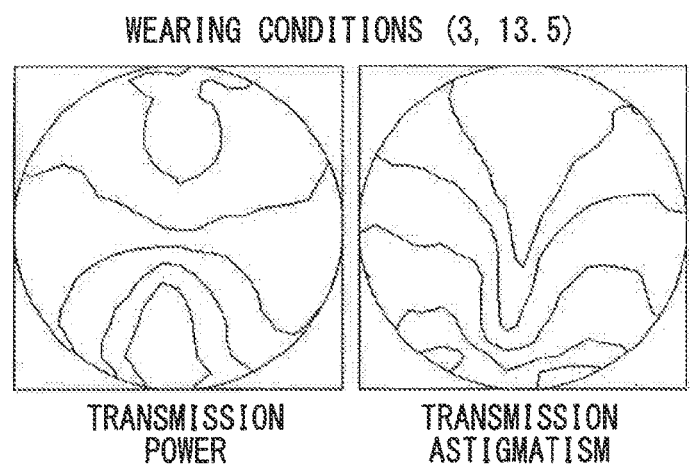

A comparison of FIG. 11(a) and FIG. 11(b) reveals that a change in the transmission power at the near vision reference point occurs as the wearing conditions change from those represented by the wearing condition parameters (0, 12) to those represented by the wearing condition parameters (3, 13.5). In addition, the addition power under wearing conditions of the eyeglass lens in this comparison example worn in the wearing conditions represented by the wearing condition parameters (0, 12) is 2.00, whereas the addition power in the wearing conditions represented by the wearing condition parameters (3, 13.5) is 1.95, which is considerably smaller than the addition power in the wearing conditions represented by the wearing condition parameters (0, 12). It is to be noted that the addition power specified for the wearer in the prescription requirements is 2.00. This means that if the eyeglasses have slid down, the eyeglass wearer is not able to clearly see an object at an assumed point at close range. In other words, the performance of the eyeglass lens in the comparison example deteriorates in the wearing conditions deviating from the wearing conditions represented by the wearing condition parameters used for the optimization. In contrast, the eyeglass lens achieved in variation 1 designed based upon the plurality of sets of design data obtained through optimization individually executed in correspondence to the plurality of wearing condition parameter patterns, better sustains the desired performance even when the eyeglasses become shifted.

It is to be noted that in the example described above, six wearing condition parameter patterns to be used for optimization are set over a range of (0, 12) through (5, 14.5) by assuming that the range of wearing condition parameter deviation that may occur while the eyeglass wearer wears the eyeglasses is a wearing condition parameter range of (0, 12) through (3, 13.5). A specific wearing condition parameter range and a specific quantity of wearing condition parameter patterns to be set may be determined through advance testing, through automatic calculation executed for each order or through a self learning method. A wearing condition parameter may take values set over equal intervals in different patterns, it may take values differentiated by unequal intervals, or wearing condition parameter patterns may be generated with higher density over a crucial range.

In addition, in the example described above, the direction along which values taken for the wearing condition parameters in the patterns to be used for the optimization are altered, relative to the values of the wearing condition parameters (0, 12) representing the proper setting conditions, is one-dimensionally set (namely, the values taken for the pantoscopic tilt and the corneal vertex distance are both shifted by predetermined values). As an alternative, the direction along which the wearing condition parameter values are altered may be set two dimensionally (i.e., the values taken for the pantoscopic tilt and the corneal vertex distance may be individually and separately shifted). Furthermore, another parameter, in addition to the two wearing condition parameters, i.e., the pantoscopic tilt and the corneal vertex distance, may take different values.

It is to be noted that design data generated for the final eyeglass lens by calculating an average or a weighted average of the plurality of sets of eyeglass lens design data may indicate a spherical diopter power value slightly different from the spherical diopter power specified in the prescription requirements. In such a case, power correction should be executed on the design data for the final eyeglass lens.

(Variation 2 of the Second Embodiment)

In step S2, wearing condition parameter deviation quantities are set in correspondence to the eyeglass wearer usage mode. However, wearing condition parameter deviation quantities may be measured at the eyewear store by measuring the wearing condition parameters while the eyeglass wearer makes motions.

(Variation 3 of the Second Embodiment)

While optimization is executed in the embodiment described above by using a plurality of wearing condition parameter patterns through parallel processing, the optimization may, in the future, be executed in series once sufficiently high computation speed is assured through improvement in computer performance.

(Variation 4 of the Second Embodiment)

In the second embodiment described above, too, a plurality of prescription requirement patterns may be generated as in the first embodiment and optimization may be executed through parallel processing individually for patterns, the quantity of which matches the number of possible combinations made up of one of the plurality of wearing condition parameter patterns and one of the plurality of prescription requirement patterns.

—Third Embodiment—

Next, the third embodiment of the present invention will be described. The essential features of the third embodiment will first be outlined. Conventionally, an eyeglass wearer selects an eyeglass through the flow of the process described below. First, the eyeglass wearer has his eyes examined by an ophthalmologist and obtains a prescription for an eyeglass lens. The prescription indicates prescription requirements such as the spherical diopter power, the astigmatic power, the astigmatic axis, the addition power and the pupillary distance. The eyeglass wearer takes the prescription to an eyewear store. At the eyewear store, a sales person interviews the eyeglass wearer. In the interview, the eyeglass wearer is asked how he typically uses his eyeglasses, e.g., whether for far vision or near vision and the like. Based upon the interview results, the sales person selects a specific lens type deemed desirable for the particular eyeglass wearer. In addition, the near vision rotation angle is also checked during the interview so as to determine a progressive zone length. Once the lens type and the progressive zone length are determined, a semi-finished lens blank, from which the final lens is to be manufactured, is selected.

A system capable of mechanically executing work for determining the lens type and the progressive zone length has come into practical use in recent years. Through this system, a specific lens type and a progressive zone length are automatically determined once the eyeglass wearer undergoes several predetermined types of measurement and answers several predetermined questions.

Finally, the eyeglass lens design work is completed by optimizing the selected lens blank based upon the prescription requirements (the spherical diopter power, the astigmatic power, the astigmatic axis, the addition power and the like), the wearing condition parameters and the lifestyle/habit parameters.

However, what the eyeglass wearer is able to view when selecting a lens type in the eyeglass lens design process described above is an aberration diagram corresponding to the basic design of a given lens product, or a performance chart or an image chart simulating the aberration diagram, instead of an aberration diagram for the optimized lens he will actually purchase or a performance chart or an image chart simulating such an aberration diagram. The aberration diagram corresponding to the basic design, which does not yet reflect the prescription requirements for the eyeglass wearer, greatly differs from the aberration diagram for the optimized lens reflecting the prescription requirements. For instance, an aberration diagram reflecting prescription requirements such as the astigmatic power and the astigmatic axis will become greatly distorted along the direction in which the astigmatic axis extends. In other words, the eyeglass wearer at present has to select a lens type without being able to view the aberration diagram for the lens he will be actually using.

The significant length of time required for the optimization is the reason that the eyeglass wearer has to select a lens type by viewing the aberration diagram corresponding to the pre-optimization basic design. If optimizations of a plurality of lens types are to be compared, the length of required processing time is bound to increase by an extent corresponding to the number of lens types to be compared against one another. For instance, if three patterns are to be compared, a processing time length triple the normal processing time will be required. For this reason, the eyeglass wearer cannot at present compare instances of aberration at a plurality of types of lenses optimized by reflecting his prescription requirements.

In order to address this issue, a plurality of patterns for a lens type, a progressive zone length, wearing condition parameters and lifestyle/habit parameters, are generated and optimization is executed through parallel processing by reflecting the prescription requirements in correspondence to each pattern through the eyeglass lens design method achieved in the third embodiment. Through this method, eyeglass lenses corresponding to a plurality of patterns, which reflect the prescription requirements for the eyeglass wearer, can be designed over a short length of time and instances of aberration in the eyeglass lenses can be compared.

The eyeglass lens design method achieved in the third embodiment will be described in specific detail below. It is to be noted that the configuration of the design system used in the third embodiment is similar to the configuration of the design system 1 (FIG. 1) in the first embodiment and a repeated explanation will not be provided.

Figure 12:
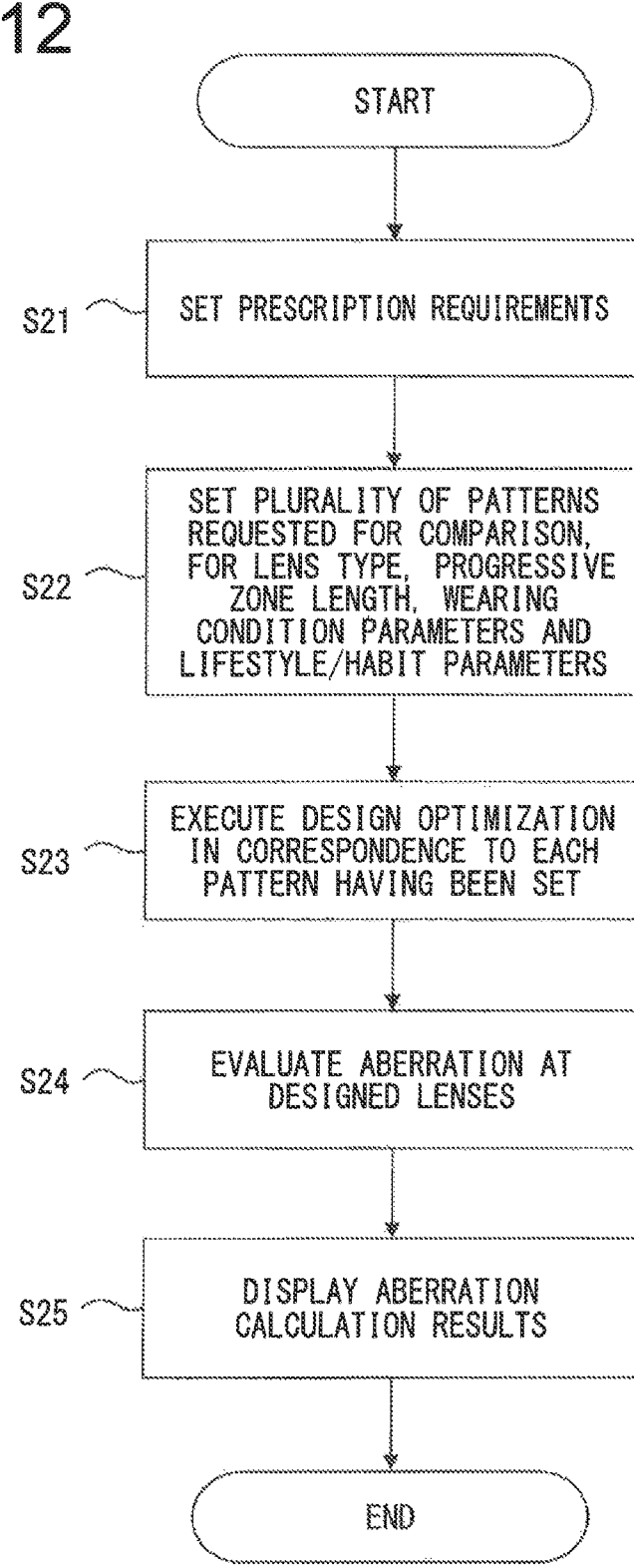
FIG. 12 shows a flowchart of the eyeglass lens design procedure achieved in a third embodiment.

The eyeglass lens design procedure implemented in the third embodiment will be explained in reference to the flowchart presented in FIG. 12. In step S21, a sales person at an eyewear store sets prescription requirements to which the eyeglass lens being ordered is to conform and enters the prescription requirements into the order placing device 10.

In step S22, the sales person at the eyewear store sets a plurality of patterns that the eyeglass wearer wishes to compare against one another with regard to aberration for at least one of a lens type, a progressive zone length, wearing condition parameters and lifestyle/habit parameters, and enters the plurality of patterns thus set to the order placing device 10. For instance, for a lens type, a plurality of lens types that the eyeglass wearer wishes to compare with regard to aberration may be selected from a plurality of applicable lens types. In addition, for a progressive zone length, a plurality of progressive zone length candidate values that the eyeglass wearer wishes to compare with regard to aberration may be set from a progressive zone length range over which the eyeglass lens can be designed. A plurality of candidate values that the eyeglass wearer wishes to compare with regard to aberration may be set for a wearing condition parameter, or a value measured on the eyeglass wearer or a default value may be set for a wearing condition parameter. For a lifestyle/habit parameter, too, a plurality of candidate values may be set for comparison with regard to aberration or a single fixed value may be set.

The order placing device 10 transmits, via the communication line 40, the prescription requirements, and the plurality of patterns set for comparison with regard to aberration for the lens type, the progressive zone length, the wearing condition parameter value and the lifestyle/habit parameter value, having been entered by the sales person at the eyewear store, to the designing device 20.

In step S23, the designing device 20 executes optimization based upon the prescription requirements having been transmitted from the order placing device 20 in correspondence to the plurality of patterns set in step S22 taking different values for at least one of the pattern components, i.e., the lens type, the progressive zone length, the wearing condition parameters and the lifestyle/habit parameters. In this step, a design solution is obtained in correspondence to each pattern by executing optimization for each of the patterns having been set in step S22. As a result, sets of design data for the eyeglass lens (design solutions) the number of which matches the quantity of patterns set in step S22, are obtained. In addition, the designing device 20 executes optimization for the plurality of patterns through parallel processing (see FIG. 6), as in the second embodiment explained earlier. Namely, in the parent process, child processes are generated in a quantity matching the quantity of patterns set in step S22, and a design solution is obtained through an optimization calculation executed independently in each of the child processes by using the parameter values input thereto. Through these measures, optimization corresponding to the plurality of patterns, each representing a specific combination of a lens type, a progressive zone length, wearing condition parameters and lifestyle/habit parameters can be completed within a processing time length substantially the same as the processing time required for optimization for a single pattern, as in the second embodiment.

In step S24, the designing device 20 evaluates instances of aberration at the plurality of eyeglass lenses designed in step S23 and transmits the evaluation results to the order placing device 10.

In step S25, the order placing device 10 displays the aberration evaluation results for the various eyeglass lenses, having been transmitted from the designing device 20, at a display device. It is to be noted that the aberration evaluation results may be displayed in the form of aberration diagrams, performance charts or image charts simulating the aberration diagrams, numerical values indicating the performance, or graphs of numerical values. In other words, the aberration evaluation results may be provided in any manner as long as the performance and the aberration characteristics of each lens can be ascertained.

Since this allows the eyeglass wearer to view the performance and the aberration characteristics of lenses reflecting his prescription requirements and select an eyeglass lens he prefers, customer satisfaction can be improved.

It is to be noted that the order placing device 10 may output the aberration evaluation results for the individual eyeglass lenses (the aberration diagrams, the graphs or the like, as explained earlier) having been transmitted from the designing device 10 to a printer so as to print out the evaluation results on the printer.

The following advantage and operation are achieved through the third embodiment described above.

The eyeglass lens design method achieved in the third embodiment comprises a prescription requirement-setting step in which prescription requirements for an eyeglass lens pertaining to an eyeglass wearer are set, a pattern setting step in which a plurality of patterns are set for at least one of a lens type, a progressive zone length, wearing condition parameter value and lifestyle/habit parameter values and a designing step in which eyeglass lenses are designed through parallel processing based upon the prescription requirements set in the prescription requirement-setting step, each in correspondence to one of the plurality of patterns set in the pattern setting step. It further comprises an output step in which a plurality of eyeglass lenses designed through the designing step are evaluated and evaluation results are output via an output device. Through this method, eyeglass lenses corresponding to the plurality of patterns can be designed over a processing time length substantially the same as the length of processing time required for designing an eyeglass lens in correspondence to a single pattern and evaluation results obtained by evaluating the designed eyeglass lenses can be reported to the eyeglass wearer.

—Fourth Embodiment—

Next, the fourth embodiment of the present invention will be described. The essential features of the fourth embodiment will first be outlined. In the fourth embodiment, the number of eyeglass lenses is adjusted as requested by the eyeglass wearer and the best eyeglass lens among them is selected. For instance, a given eyeglass wearer may wish to purchase an inexpensive lens assuring acceptable vision, whereas another eyeglass wearer may be willing to pay a considerable price for a lens achieving superior vision. In such a case, an eyeglass lens designed through optimization executed by setting the wearing condition parameters and the lifestyle/habit parameters at default values is offered to the former eyeglass wearer and the best lens selected from a plurality of eyeglass lenses designed through optimization executed in correspondence to a plurality of patterns generated by increasing/decreasing the wearing condition parameter and lifestyle/habit parameter values relative to the default values is offered to the latter eyeglass wearer. While a lens selected from eyeglass lenses designed in correspondence to a greater quantity of patterns is bound to assure better lens performance, such a lens can be, at present, ready only after considerable delay, the length of which corresponds to the quantity of patterns.

In order to address this issue, patterns taking on different wearing condition parameter and lifestyle/habit parameter values are prepared in a quantity specified by the eyeglass wearer in the eyeglass lens design method achieved in the third embodiment. Then, eyeglass lenses are designed in the quantity specified by the eyeglass wearer through optimization executed through parallel processing based upon the prescription requirements in correspondence to each of the patterns described above and the best lens among these lenses is selected. Through these measures, a lens assuring good performance can be provided with a wait time the same as that required for a single pattern even when the eyeglass wearer asks for a great quantity of patterns.

The eyeglass lens design method achieved in the fourth embodiment will be described in specific detail below. It is to be noted that the configuration of the design system used in the third embodiment is similar to the configuration of the design system 1 (FIG. 1) in the first embodiment and a repeated explanation will not be provided.

Figure 13:
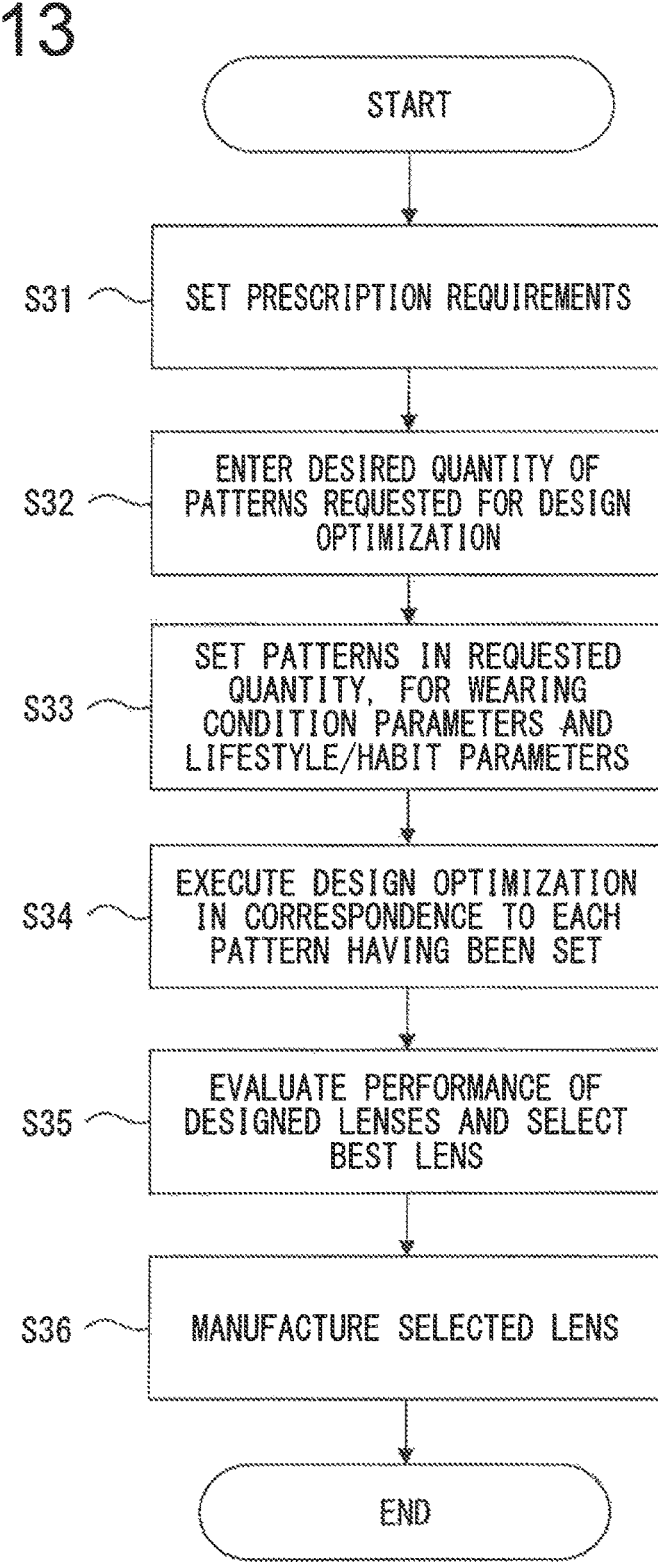
FIG. 13 shows a flowchart of the eyeglass lens design procedure achieved in a fourth embodiment.

The eyeglass lens design procedure implemented in the fourth embodiment will be explained in reference to the flowchart presented in FIG. 13. In step S31, a sales person at an eyewear store sets prescription requirements to which the eyeglass lens being ordered is to conform and enters the prescription requirements into the order placing device 10.

In step S32, the sales person at the eyewear store enters the quantity of patterns for optimization requested by the eyeglass wearer into the order placing device 10. The price charged to the eyeglass wearer may be determined in correspondence to the quantity of patterns he requests as a purchasing option. In addition, a specific type of parameter among the wearing condition parameters and the lifestyle/habit parameters that the eyeglass wearer wishes to have altered in the patterns set for optimization is selected. This parameter may be selected by the eyeglass wearer himself and then be entered into the order placing device 10. As an alternative, it may be determined by the order placing device 10 based upon answers to several questions posed to the eyeglass wearer.

The order placing device 10 transmits the prescription requirements, the quantity of patterns to be set for optimization as requested by the eyeglass wearer and the specific type of parameter that the eyeglass wearer wishes to have adjusted in the patterns, having been input by the sales person at the eyewear store, to the designing device 20 via the communication line 40.

In step S33, the designing device 20 sets patterns for a wearing condition parameter and a lifestyle/habit parameter to be used in the lens design through optimization, based upon the quantity of patterns that the eyeglass wearer has requested for optimization and the type of parameter that the eyeglass wearer wishes to have adjusted in the patterns, having been transmitted from the order placing device 10. For instance, if the eyeglass wearer has requested a single pattern for optimization, the values measured on the eyeglass wearer or the default values are set for the wearing condition parameters and the lifestyle/habit parameters. In addition, if the eyeglass wearer has requested three patterns for optimization and the parameter that the eyeglass wearer wishes to have adjusted in the patterns is the corneal vertex distance, three different patterns, one taking the corneal vertex distance value measured on the eyeglass wearer, another taking a corneal vertex distance value calculated by adding a predetermined value to the measured value and another taking a corneal vertex distance value calculated by subtracting a predetermined value from the measured value, are set.

In step S34, the designing device 20 executes optimization based upon the prescription requirements having been transmitted from the order placing device 10 in correspondence to each pattern set in step S33. In this step, optimization is executed in correspondence to each of the patterns set in step S23 so as to obtain design solutions in correspondence to the individual patterns. As a result, sets of design data (design solutions) for eyeglass lenses, the number of which matches the requested quantity set in step S22 are obtained. In addition, the designing device 20 executes optimization for the plurality of wearing condition parameter patterns through parallel processing (see FIG. 6), as in the second embodiment explained earlier. Namely, in the parent process, child processes are generated in a quantity matching the quantity of patterns set in step S33, and design solutions are each obtained through an optimization calculation executed independently in each of the child processes by using the parameter values input thereto. Through these measures, optimization corresponding to the plurality of patterns for wearing condition parameters and lifestyle/habit parameters can be completed within a processing time length substantially the same as the processing time required for optimization of a single pattern, as in the second embodiment.

In step S35, the designing device 20 evaluates the optical performance of each eyeglass lens designed in step S34 and selects an eyeglass lens assuring the best optical performance among the eyeglass lenses designed in step S34 as the eyeglass lens to be provided to the eyeglass wearer. It is to be noted that the eyeglass lenses may be evaluated and the best eyeglass lens may be selected through a method similar to that described in reference to the first embodiment, or through an alternative method.

In step S36, the designing device 20 outputs the design data for the eyeglass lens selected in step S25 to the edger control device 30. Based upon the design data output from the designing device 20, the edger control device 30 issues an edging instruction to the eyeglass lens edger 50. The eyeglass lens edger 50 machines the eyeglass lens based upon the edging instruction and thus the eyeglass lens selected in step S25 is manufactured. As a result, the best eyeglass lens, selected from eyeglass lenses, the number of which has been requested by the eyeglass wearer, can be provided to the eyeglass wearer.

The following advantage and operation are achieved through the fourth embodiment described above.

The eyeglass lens design method achieved in the fourth embodiment comprises a prescription requirement-setting step in which prescription requirements for an eyeglass lens pertaining to an eyeglass wearer are set, a pattern setting step in which a plurality of patterns for a wearing condition parameter and a lifestyle/habit parameter are set and a designing step in which eyeglass lenses are designed through parallel processing based upon the prescription requirements set in the prescription requirement-setting step, each in correspondence to one of the plurality of patterns set in the pattern setting step. It further comprises a pattern quantity specifying step in which a pattern quantity is specified and patterns are set in the pattern setting step in the quantity specified through the pattern quantity specifying step. Through this method, eyeglass lenses corresponding to the plurality of patterns, the quantity of which has been requested by the eyeglass wearer, can be designed over a processing time length substantially the same as the length of processing time required for designing an eyeglass lens in correspondence to a single pattern.

—Fifth Embodiment—

The fifth embodiment of the present invention will be described next. The fifth embodiment relates to optimization of left and right eyeglass lenses. The optimization executed in the embodiment will be explained briefly. The elements of the optimization include a target (e.g., an aberration value) to be achieved, design parameters (e.g., lens curvature, lens thickness and lens distance) which are variables in achieving the target, optimization parameters (e.g., a weighting factor and a damping factor) used to control the optimization and a merit function that indicates the difference between the current condition and the target as a single numerical value. The basic phases of the optimization are; a first phase in which values taken for the optimization parameters in the merit function are determined, a second phase in which partial derivative of the merit function is executed with respect to each of the parameters in the merit function and a third phase in which design parameter values to achieve the smallest value for the merit function are determined by solving a matrix constituted with the partial derivative values. In the optimization, the first through third phases are executed in repeated rotation while adjusting the optimization parameters so as to adjust the current condition closer to the target.

The flow of the optimization executed for left and right eyeglass lenses in the related art will be explained next. First, optimization is executed for the lens for one eye by setting the prescription requirements, such as the spherical diopter power, the astigmatic power and the astigmatic axis and also setting the wearing condition parameters and the lifestyle/habit parameters, and the optimization is completed. Next, optimization is executed for the lens for the other eye by setting the prescription requirement such as the spherical diopter power, the astigmatic power and the astigmatic axis and also setting the wearing condition parameters and the lifestyle/habit parameters and the design work is completed. During this process, a common target for the left eyeglass lens and the right eyeglass lens is used for the optimization of the left and right eyeglass lenses. However, the optimization for the left eyeglass lens and the optimization for the right eyeglass lens are executed independently of each other, which means that good convergence cannot be achieved and thus eyeglass lenses with high performance cannot be obtained.

In order to address this issue, optimization for the left eyeglass lens and optimization for the right eyeglass lens are executed through parallel processing in the eyeglass lens design method achieved in the fifth embodiment so as to enable optimization executed with the optimization parameters adjusted by taking into consideration the conditions of the left and right eyeglass lenses while the optimization is underway.

The eyeglass lens design method achieved in the fifth embodiment will be described in specific detail below. It is to be noted that the configuration of the design system used in the fifth embodiment is similar to the configuration of the design system 1 (FIG. 1) in the first embodiment and a repeated explanation will not be provided.

Figure 14:
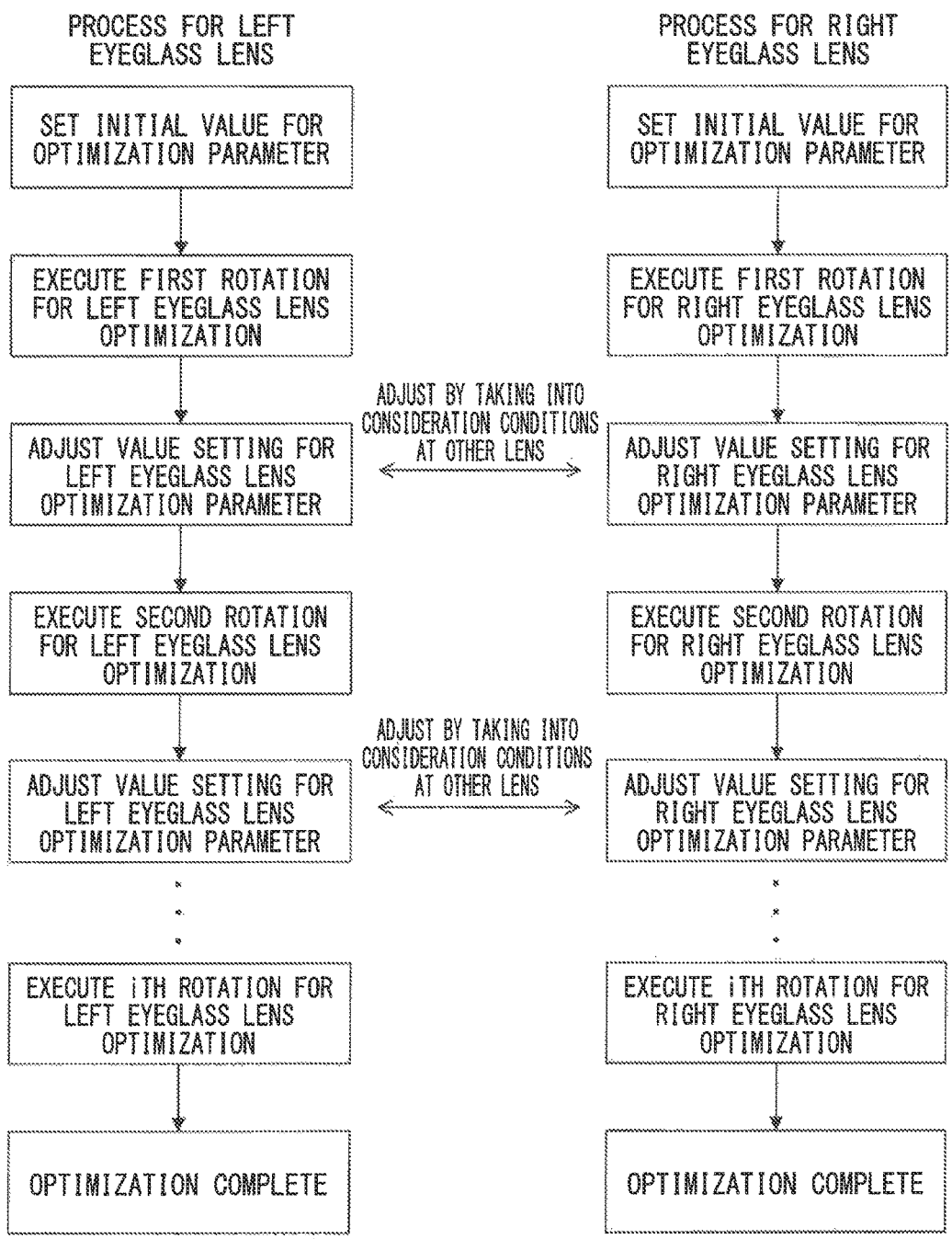
FIG. 14 shows a flowchart showing how eyeglass lenses may be optimized in a fifth embodiment.

In reference to FIG. 14, the flow of the eyeglass lens optimization executed in the fifth embodiment will be described. The design program executed in the designing device 20 first generates two processes. Through one of the processes, the optimization calculation for the left eyeglass lens is executed, whereas the optimization calculation for the right eyeglass lens is executed through the other process. These processes are concurrently executed through parallel processing.

In each of these processes, the prescription requirements such as the spherical diopter power, the astigmatic power and the astigmatic axis, the wearing condition parameters and the lifestyle/habit parameters are first set. Then, initial values for the optimization parameters are set in each process. Next, a first rotation (of the first phase through the third phase explained earlier) is executed for the optimization in each process.

Subsequently, the value settings for the optimization parameters in the two processes are adjusted by taking into consideration the conditions of both the left eyeglass lens and the right eyeglass lens following the execution of the first rotation. For instance, the merit function used in the process for the left eyeglass lens and the merit function used in the process for the right eyeglass lens may be compared with each other and the value settings for the optimization parameters in the process corresponding to the lens, the current condition of which deviates further from the target, may be adjusted.

Once the optimization parameters are adjusted, a second rotation is executed in the processes by using the adjusted optimization parameters, and following execution of the second rotation, the optimization parameters are adjusted again as described above. In other words, in each process, a phase through which a rotation is executed and a phase through which the optimization parameters are adjusted by taking into consideration the conditions of both the left eyeglass lens and the right eyeglass lens are repeatedly alternated. Once the optimization is completed, both processes end.

As described above, the optimization is controlled based upon information exchanged between the process for the left eyeglass lens and the process for the right eyeglass lens during each rotation so as to enable optimization that assures a high level of integrity of the left eyeglass lens and the right eyeglass lens as a unit while the optimization is underway. As a result, the lenses are optimized for desirable binocular vision at an early stage of the optimization calculation and thus lenses assuring good binocular vision can be designed.

The following advantages and operations are achieved through the fifth embodiment described above.

(1) The eyeglass lens design method achieved in the fifth embodiment comprises a prescription requirement-setting step in which prescription requirements for eyeglass lenses to be worn by an eyeglass wearers are set, a pattern setting step in which an optimization parameter for a left eyeglass lens and an optimization parameter for a right eyeglass lens are set, and a designing step in which eyeglass lenses are designed based upon the prescription requirements set through the prescription requirement-setting step, individually in correspondence to the optimization parameter for the left eyeglass lens and the optimization parameter for the right eyeglass lens, both set in the pattern setting step. Through this method, the length of time required for the processing can be reduced in comparison to the length of processing time required when the left eyeglass lens and the right eyeglass lens are designed in series.

(2) In the designing step in the design method described in (1) above, an optimization calculation step in which eyeglass lens optimization calculations are executed through parallel processing in correspondence to the optimization parameter for the left eyeglass lens and the optimization parameter for the right eyeglass lens, and an optimization parameter setting step in which the left eyeglass lens and the right eyeglass lens having been designed through the optimization calculation step are evaluated and the optimization parameter for the left eyeglass lens and the optimization parameter for the right eyeglass lens to be used in the next optimization calculations are set based upon evaluation results, are alternately executed repeatedly. Through these measures, the left eyeglass lens and the right eyeglass lens can be optimized by sustaining the integrity of the two lenses as a unit and thus, the lenses assuring good binocular vision can be designed.

—Sixth Embodiment—

The sixth embodiment of the present invention will be described next. It is to be noted that the configuration of the design system used in the sixth embodiment is similar to the configuration of the design system 1 (FIG. 1) in the first embodiment and a repeated explanation will not be provided.

As explained earlier, a rotation of the first through third phases is executed repeatedly by adjusting the optimization parameter values so as to adjust the current conditions closer to the target and thus achieve lens optimization. In the sixth embodiment, the length of time required for the optimization is reduced by executing rotations in correspondence to one of a plurality of optimization parameter values through parallel processing.

Figure 15:
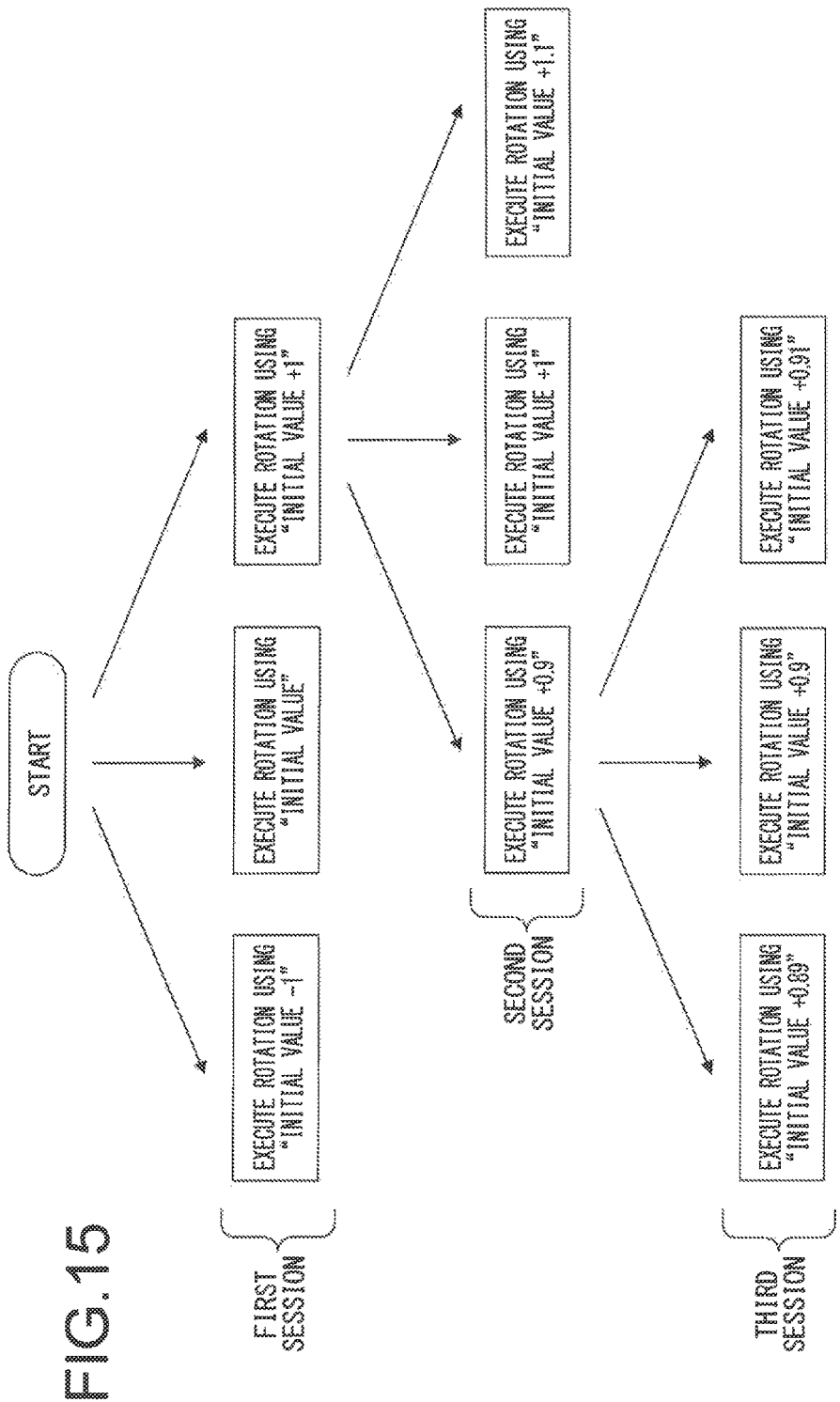
FIG. 15 shows a flowchart showing how an eyeglass lens may be optimized in a sixth embodiment.

FIG. 15 presents an example of a flow through which an eyeglass lens may be optimized in the sixth embodiment. In the design program executed by the designing device 20, value settings for an optimization parameter, including an initial value and values calculated by increasing and decreasing the initial value, are prepared. In the example presented in FIG. 15, three different value settings, "initial value", "initial value +1" and "initial value −1", are prepared. Then, processes are generated each in correspondence to one of the prepared value settings and in each process, a first rotation for optimization is executed by using the corresponding value setting. The optimization calculations in the various processes are executed concurrently through parallel processing. Subsequently, the merit functions in the various processes are compared, and the value setting for the optimization parameter in the process achieving a condition currently closest to the target is selected. For instance, "initial value +1" may be selected.

Next, the selected value setting and value settings calculated by increasing and decreasing the selected value setting are prepared. In this situation, the extent by which the value setting is increased/decreased is smaller than the extent by which the initial value is increased/decreased for the first rotation. In the example presented in FIG. 10, three value settings, the selected value setting "initial value +1", "initial value +0.9" and "initial value +1.1", are prepared. Then, processes are generated each in correspondence to one of the prepared value settings and in each process, a second rotation for optimization is executed by using the corresponding value setting. The optimization calculations in the various processes are executed concurrently through parallel processing. Subsequently, the merit functions in the various processes are compared, and the value setting for the optimization parameter in the process achieving a condition currently closest to the target is selected. For instance, "initial value +0.9" may be selected.

Next, the selected value setting and value settings calculated by increasing and decreasing the selected value setting are prepared. In this situation, the extent by which the value setting is increased/decreased is smaller than the extent by which the selected value setting is increased/decreased for the second rotation. In the example presented in FIG. 15, three value settings, the selected value setting "initial value +0.9", "initial value +0.89" and "initial value +1.91", are prepared. Then, processes are generated each in correspondence to one of the prepared value settings and in each process, a third rotation for optimization is executed by using the corresponding value setting. The optimization calculations in the various processes are executed concurrently through parallel processing. Subsequently, the merit functions in the various processes are compared, and the value setting for the optimization parameter in the process achieving a condition currently closest to the target is selected.

As described above, processing through which an optimization rotation is executed by using a plurality of optimization parameter values and optimization parameter values for the next rotation are set based upon the optimization parameter value in correspondence to which the optimization achieving a condition closest to the target has been executed, is repeatedly executed. Through these measures, the length of time required for optimization parameter convergence can be reduced and consequently, the length of time required for the optimization is reduced.

The following advantage and operation are achieved through the sixth embodiment described above.

The eyeglass lens design method achieved in the sixth embodiment comprises a prescription requirement-setting step in which prescription requirements for an eyeglass lens pertaining to an eyeglass wearer are set, a pattern setting step in which a plurality of patterns are set with regard to an optimization parameter, and a designing step in which eyeglass lenses are designed through parallel processing based upon the prescription requirements set in the prescription requirement-setting step, each in correspondence to one of a plurality of optimization parameter values set in the pattern setting step. In addition, in the designing step, an optimization calculation step in which eyeglass lens optimization calculations are executed through parallel processing, each in correspondence to one of the plurality of optimization parameter values, and an optimization parameter setting step in which a plurality of eyeglass lenses, having been designed through the optimization calculation step, are evaluated and a plurality of optimization parameter values to be used in the next optimization calculations are set based upon evaluation results, are alternately executed repeatedly. Through these measures, the length of time required for optimization parameter convergence can be reduced and consequently, the length of time required for the optimization is reduced.

—Variations—

Figure 16:
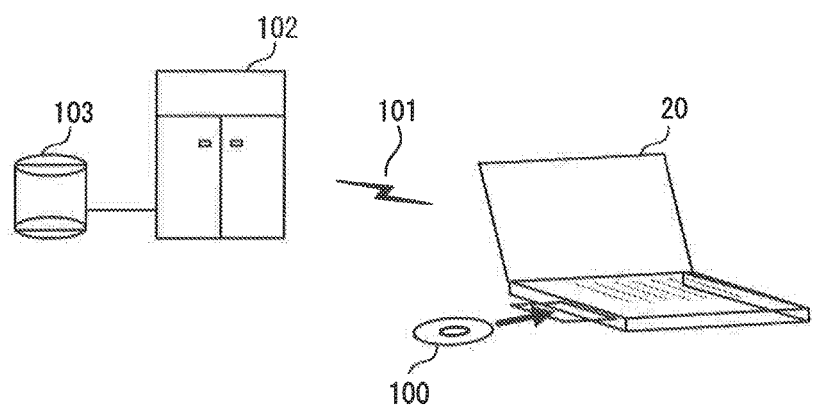
FIG. 16 shows an illustration showing how a program may be provided.

In the embodiments described above, the program that enables the designing device 20 to execute design processing is installed in a ROM within the control device 21. However, the program may be loaded into the designing device 20 by setting a storage medium 100, such as a CD-ROM with the program stored therein, at the designing device 20 or by loading the program into the designing device 20 via a communication line 101 such as a network, as illustrated in FIG. 16. The program to be loaded via the communication line 101 may be stored in, for instance, a hard disk device 103 of a server (computer) 102 connected to the communication line 101. Namely, the program may be distributed as a computer program product adopting any of various modes, including the storage medium 100 and a download via the communication line 101.

In the embodiments described above, a progressive power eyeglass lens is designed. However, the present invention is not limited to this example and the design method according to the present invention may be adopted when designing a single-focus eyeglass lens or a multiple-focus eyeglass lens.

It is to be noted that the embodiments described above simply represent examples and the present invention is in no way limited to these examples as long as the features characterizing the present invention remain intact. Structural features of any of the embodiments may be combined together or with those of the variations as appropriate.

For instance, the second embodiment and the third embodiment described earlier may be adopted in combination. In such a case, results of aberration evaluation conducted for the plurality of eyeglass lenses designed through step S14 in the second embodiment may be indicated on the display device.

In addition, the second embodiment and the fourth embodiment described earlier may be adopted in combination. In such a case, the quantity of patterns requested by the eyeglass wearer for optimization may be set in step S13 in the second embodiment.

In addition, the second embodiment and the fifth embodiment described earlier may be adopted in combination. In this case, the left eyeglass lens and the right eyeglass lens may be optimized in parallel, as in the fifth embodiment, with the optimization executed in correspondence to the plurality of wearing condition parameter patterns set in step S13 in the second embodiment.

In addition, the second embodiment and the sixth embodiment described earlier may be adopted in combination. In this case, the optimization calculations corresponding to a plurality of optimization parameter values may be executed in parallel, as in the sixth embodiment, with the optimization executed in correspondence to the plurality of wearing condition parameter patterns set in step S13 in the second embodiment.

According to the embodiments of the present invention described above, the rate of failure in obtaining a design solution through optimization can be reduced.

What is claimed is:

1. An eyeglass lens design method, comprising:

a prescription requirement-setting step in which prescription requirements for an eyeglass lens to be worn by an eyeglass wearer are set;

a pattern setting step in which a plurality of patterns having different values for at least one of the prescription requirements for the eyeglass lens, a lens type, a progressive zone length, a wearing condition parameter pertaining to an eyeglass wearing condition in which the eyeglass wearer wears eyeglasses, a lifestyle/habit parameter pertaining to a lifestyle/habit of the eyeglass wearer, and an optimization parameter used to control optimization of design for the eyeglass lens, are set, wherein in the pattern setting step, at least one set of prescription requirements that is at least partially different from the prescription requirements having been set in the prescription requirement-setting step is generated; and a designing step in which eyeglass lens contours, each corresponding to one of the plurality of patterns having been set in the pattern setting step, are designed, wherein in the designing step, the eyeglass lens contours are designed respectively corresponding to the prescription requirements having been set in the prescription requirement-setting step and the prescription requirements having been generated in the pattern setting step.

2. The eyeglass lens design method according to claim 1, wherein:

the at least one set of prescription requirements that is at least partially different from the prescription requirements having been set in the prescription requirement-setting step is different within a range defined as an allowable refractive power difference or is different within a range over which a single value is measured on a lens meter.

3. The eyeglass lens design method according to claim 1, wherein:

in the designing step, eyeglass lens contours, each corresponding to one of the plurality of patterns having been set in the pattern setting step, are designed through parallel processing.

4. The eyeglass lens design method according to claim 1, wherein:

the designing step includes a correction step in which results obtained by designing an eyeglass lens contour based upon the prescription requirements generated through the pattern setting step are corrected so as to adjust toward the prescription requirements having been set through the prescription requirement-setting step.

5. The eyeglass lens design method according to claim 1, wherein:

in the designing step, an eyeglass lens is designed based upon results obtained by completing design work for an eyeglass lens contour before a predetermined time limit is reached, among eyeglass lens contour designs corresponding to the prescription requirements having been set in the prescription requirement-setting step and the prescription requirements having been generated in the pattern setting step.

6. The eyeglass lens design method according to claim 1, further comprising:

a deviation quantity setting step in which a deviation quantity for the wearing condition parameter is set, wherein:

in the pattern setting step, a pattern taking a value measured on the eyeglass wearer and a pattern taking a value deviating from the measured value by the deviation quantity are set for the wearing condition parameter.

7. The eyeglass lens design method according to claim 1, further comprising:
an evaluation/selection step in which a plurality of eyeglass lenses having been designed in the designing step are evaluated and an eyeglass lens to be provided to the eyeglass wearer is selected based upon evaluation results.

8. The eyeglass lens design method according to claim 1, further comprising:
an output step in which a plurality of eyeglass lenses having been designed in the designing step are evaluated and evaluation results are output via an output device.

9. The eyeglass lens design method according to claim 1, further comprising:
a pattern quantity specifying step in which a quantity of patterns is specified, wherein:
in the pattern-setting step, patterns are set in the quantity specified in the pattern quantity-specifying step.

10. The eyeglass lens design method according to claim 1, wherein:
in the designing step, an optimization calculation step and an optimization parameter setting step are alternately executed repeatedly, in the optimization calculation step eyeglass lens optimization calculations are executed individually in correspondence to an optimization parameter value for a left eyeglass lens and an optimization parameter value for a right eyeglass lens through parallel processing, and in the optimization parameter setting step the left eyeglass lens and the right eyeglass lens designed in the optimization calculation step are evaluated and an optimization parameter for the left eyeglass lens and an optimization parameter for the right eyeglass lens to be used in subsequent optimization calculations are set based upon evaluation results.

11. The eyeglass lens design method according to claim 1, wherein:
in the designing step, an optimization calculation step and an optimization parameter setting step are alternately executed repeatedly, in the optimization calculation step eyeglass lens optimization calculations are executed each in correspondence to one of a plurality of optimization parameter values through parallel processing, and in the optimization parameter setting step a plurality of eyeglass lenses designed in the optimization calculation step are evaluated and a plurality of optimization parameter values to be used in subsequent optimization calculations are set based upon evaluation results.

12. An eyeglass lens manufacturing method for manufacturing an eyeglass lens designed through the eyeglass lens design method according to claim 1.

13. An eyeglass lens designed through the eyeglass lens design method according to claim 1.

14. An eyeglass lens design system, comprising:
a memory storing instructions; and
at least one processor configured to execute the instructions to:
set prescription requirements for an eyeglass lens to be worn by an eyeglass wearer;
set a plurality of patterns having different values for at least one of the prescription requirements for the eyeglass lens, a lens type, a progressive zone length, a wearing condition parameter pertaining to an eyeglass wearing condition in which the eyeglass wearer wears eyeglasses, a lifestyle/habit parameter pertaining to a lifestyle/habit of the eyeglass wearer, and an optimization parameter used to control optimization of design for the eyeglass lens;
generate at least one set of prescription requirements that is at least partially different from the prescription requirements having been set;
design eyeglass lens contours, each in correspondence to one of the plurality of patterns having been set, through parallel processing; and
design eyeglass lens contours respectively corresponding to the prescription requirements having been set and the prescription requirements having been generated.

15. A computer-readable computer program product containing an eyeglass lens design program, the program enabling a computer to execute:
a prescription requirement-setting step in which prescription requirements for an eyeglass lens to be worn by an eyeglass wearer are set;
a pattern setting step in which a plurality of patterns having different values for at least one of the prescription requirements for the eyeglass lens, a lens type, a progressive zone length, a wearing condition parameter pertaining to an eyeglass wearing condition in which the eyeglass wearer wears eyeglasses, a lifestyle/habit parameter pertaining to a lifestyle/habit of the eyeglass wearer, and an optimization parameter used to control optimization of design for the eyeglass lens, are set, wherein in the pattern setting step, at least one set of prescription requirements that is at least partially different from the prescription requirements having been set in the prescription requirement-setting step is generated; and
a designing step in which individual threads or processes are generated each for purposes of designing an eyeglass lens contour in correspondence to one of the plurality of patterns having been set in the pattern setting step, and design processing is executed in the threads or the processes in parallel, wherein in the designing step, the eyeglass lens contours are designed respectively corresponding to the prescription requirements having been set in the prescription requirement-setting step and the prescription requirements having been generated in the pattern setting step.

16. The computer program product according to claim 15, wherein:
the computer program product is a recording medium.

17. An eyeglass lens design method, comprising:
a prescription requirement-setting step in which prescription requirements for an eyeglass lens to be worn by an eyeglass wearer are set;
a pattern setting step in which a plurality of patterns having different values for at least one of the prescription requirements for the eyeglass lens, a lens type, a progressive zone length, a wearing condition parameter pertaining to an eyeglass wearing condition in lifestyle/habit of the eyeglass wearer, and an optimization parameter used to control optimization of design for the eyeglass lens, are set; and
a designing step in which eyeglass lens contours, each corresponding to one of the plurality of patterns having been set in the pattern setting step, are designed, wherein in the designing step, an eyeglass lens is designed based upon results obtained by completing design work for an eyeglass lens contour before a predetermined time limit is reached, among eyeglass lens contour designs corresponding to the prescription requirements having been set in the prescription requirement-setting step and the prescription requirements having been generated in the pattern setting step.

18. An eyeglass lens design system, comprising:
a memory storing instructions; and
at least one processor configured to execute the instructions to:
set prescription requirements for an eyeglass lens to be worn by an eyeglass wearer;
set a plurality of patterns having different values for at least one of the prescription requirements for the eyeglass lens, a lens type, a progressive zone length, a wearing condition parameter pertaining to an eyeglass wearing condition in which the eyeglass wearer wears eyeglasses, a lifestyle/habit parameter pertaining to a lifestyle/habit of the eyeglass wearer, and an optimization parameter used to control optimization of design for the eyeglass lens; and
design eyeglass lens contours, each in correspondence to one of the plurality of patterns having been set by the pattern setting unit, through parallel processing, wherein the designing includes designing an eyeglass lens based upon results obtained by completing design work for an eyeglass lens contour before a predetermined time limit is reached, among eyeglass lens contour designs corresponding to the prescription requirements having been set and the prescription requirements having been generated.

19. A computer-readable computer program product containing an eyeglass lens design program, the program enabling a computer to execute:
a prescription requirement-setting step in which prescription requirements for an eyeglass lens to be worn by an eyeglass wearer are set;
a pattern setting step in which a plurality of patterns having different values for at least one of the prescription requirements for the eyeglass lens, a lens type, a progressive zone length, a wearing condition parameter pertaining to an eyeglass wearing condition in which the eyeglass wearer wears eyeglasses, lifestyle/habit parameter pertaining to a lifestyle/habit of the eyeglass wearer and an optimization parameter pertaining to an lifestyle/habit of the eyeglass wearer, and an optimization parameter used to control optimization of design for the eyeglass lens, are set; and
a designing step in which individual threads or processes are generated for purposes of designing an eyeglass lens contour in correspondence to one of the plurality of patterns having been set in the pattern setting step, the design processing is executed in the threads or the processes in parallel, wherein in the designing step, an eyeglass lens is designed based upon results obtained by completing design work for an eyeglass lens contour before a predetermined time limit is reached, among eyeglass lens contour designs corresponding to the prescription requirements having been set in the prescription requirement-setting step and the prescription requirements having been generated in the pattern setting step.

* * * * *